US008000924B2

(12) United States Patent
Sato et al.

(10) Patent No.: US 8,000,924 B2
(45) Date of Patent: Aug. 16, 2011

(54) INPUT DEVICE ATTITUDE PREDICTION

(75) Inventors: Kenta Sato, Kyoto (JP); Keizo Ohta, Kyoto (JP)

(73) Assignee: Nintendo Co., Ltd., Kyoto-shi (JP)

( * ) Notice: Subject to any disclaimer, the term of this patent is extended or adjusted under 35 U.S.C. 154(b) by 157 days.

(21) Appl. No.: 12/210,575

(22) Filed: Sep. 15, 2008

(65) Prior Publication Data
US 2010/0010772 A1    Jan. 14, 2010

(30) Foreign Application Priority Data
Jul. 10, 2008 (JP) .................. 2008-180604

(51) Int. Cl.
*G01C 17/00* (2006.01)
*G06F 19/00* (2006.01)
(52) U.S. Cl. ............ 702/153; 702/92; 382/103; 463/37
(58) Field of Classification Search ............. 702/153
See application file for complete search history.

(56) References Cited

U.S. PATENT DOCUMENTS

| | | | |
|---|---|---|---|
| 5,574,479 A | 11/1996 | Odell | |
| 5,627,565 A | 5/1997 | Morishita et al. | |
| 5,638,092 A * | 6/1997 | Eng et al. ....................... | 345/158 |
| 6,681,031 B2 * | 1/2004 | Cohen et al. .................. | 382/103 |
| 6,982,697 B2 | 1/2006 | Wilson et al. | |
| 7,139,983 B2 | 11/2006 | Kelts | |
| 7,158,118 B2 | 1/2007 | Liberty | |
| 7,262,760 B2 | 8/2007 | Liberty | |
| 7,292,151 B2 | 11/2007 | Ferguson et al. | |
| 7,414,611 B2 | 8/2008 | Liberty | |
| 7,918,733 B2 * | 4/2011 | Zalewski et al. ................ | 463/39 |
| 2009/0177437 A1 * | 7/2009 | Roumeliotis .................. | 702/150 |
| 2010/0114517 A1 * | 5/2010 | Boeve et al. ................... | 702/92 |

FOREIGN PATENT DOCUMENTS
JP    2004-132769    4/2004

OTHER PUBLICATIONS

ADXL202 Specification Sheet: Low Cost ±2 g Dual Axis i MEMs® Accelerometer with Digital Output; Analog Devices, Inc., 1998.
ADXL330 Specification Sheet: Small, Low Power, 3-Axis ±3 g i MEMs® Accelerometer; Analog Devices, Inc., 2007.

(Continued)

*Primary Examiner* — Jonathan C Teixeira Moffat
(74) *Attorney, Agent, or Firm* — Nixon & Vanderhye P.C.

(57) ABSTRACT

A first attitude calculation means S2 calculates a first attitude indicating an attitude of an input device itself based on a motion detection signal output from an input device equipped with a motion detection sensor. A motion calculation means S21 calculates a motion of the first attitude. An approaching operation determination means S22 to S24 determines whether or not the motion of the first attitude calculated by the motion calculation means is a motion of approaching a predetermined attitude. An input attitude setting means S27, S28, S4 sets an attitude obtained by correcting the first attitude as an input attitude if the motion of the first attitude is the motion of approaching the predetermined attitude, and sets the first attitude as an input attitude if the motion of the first attitude is not the motion of approaching the predetermined attitude. A process execution means S5 performs a predetermined information process based on the input attitude.

21 Claims, 19 Drawing Sheets

OTHER PUBLICATIONS

Pictures of Microsoft Xwand retrieved on May 13, 2009 from http://www.kfl2.com/blogs/uploads/xwand.jpg and http://www.cs.cmu.edu/%7Edwilson/images/xwand.jpg.

Wilson, Andrew D., et al.; "Demonstration of the XWand Interface for Intelligent Spaces"; Microsoft Research; UIST '02 Companion; pp. 37-38.

Wilson, Daniel, et al.; "Gesture Recognition Using the XWand"; Robotics Institute; Carnegie Mellon University; tech report CMU-RI-TR-04-57; Apr. 2004.

Wilson, Andy, "XWand: UI for Intelligent Environments"; Apr. 26, 2004; retrieved May 12, 2009 from http://research.microsoft.com/en-us/um/people/awilson/wand/default.htm.

Wilson, Andrew, et al.; "XWand: UI for Intelligent Spaces"; Microsoft Research; CHI 2003, Apr. 5-10, 2003; Ft. Lauderdale, FL.

SELECTECH Air Mouse, Description; retrieved on May 5, 2009 from http://cgi.ebay.com.my/ws/eBayISAPI.dll?ViewItem&item=350096666675&indexURL.

* cited by examiner

F I G. 1 7
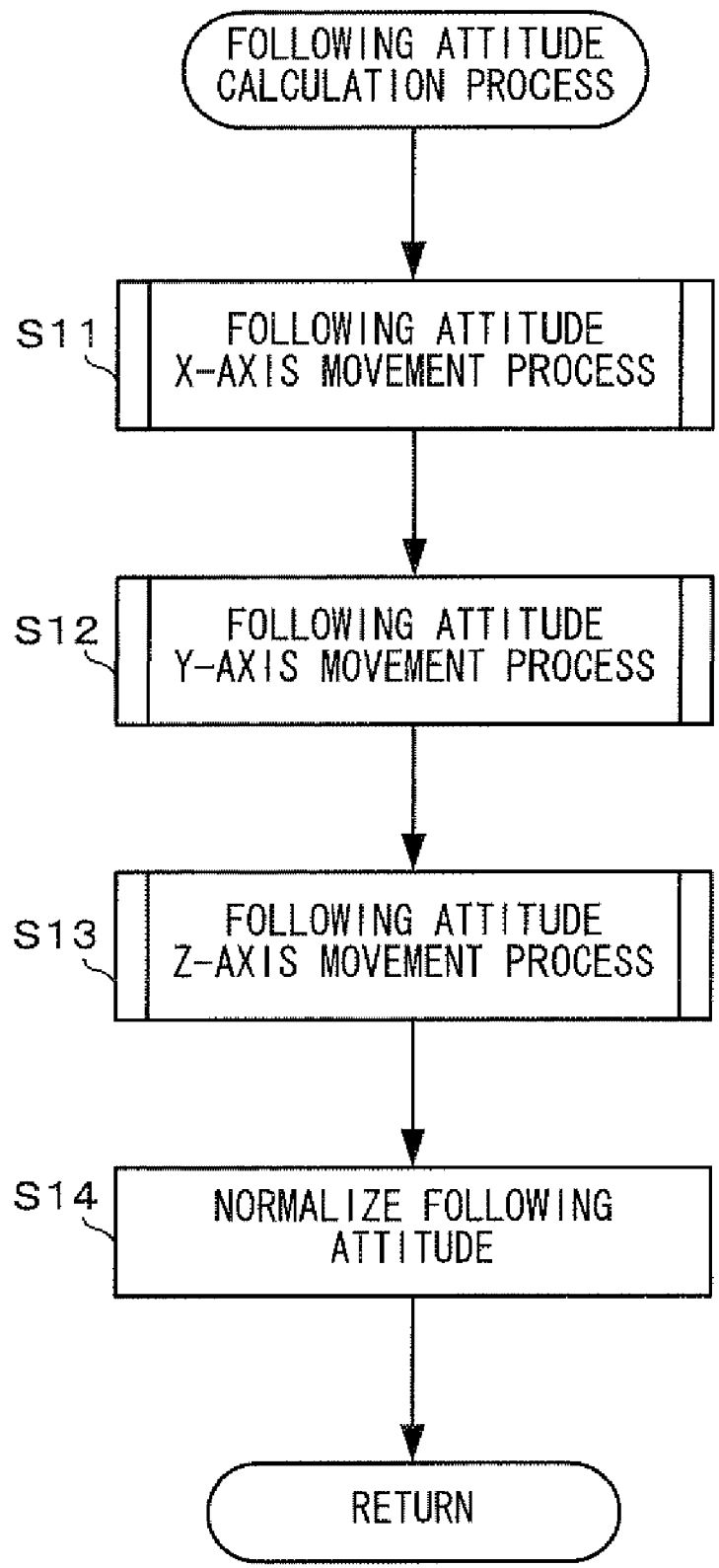

FIG. 20
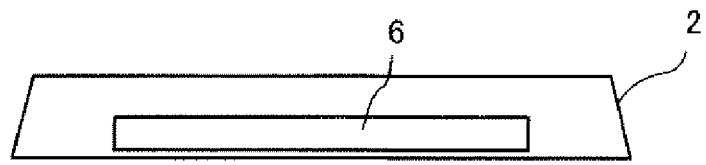
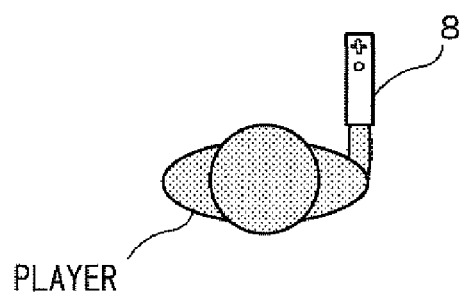
PLAYER
FIG. 21
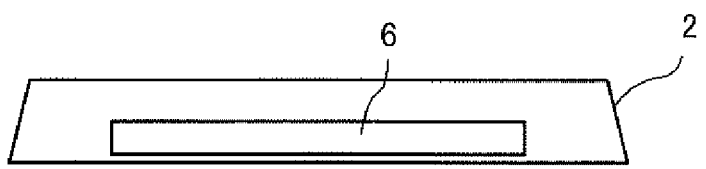
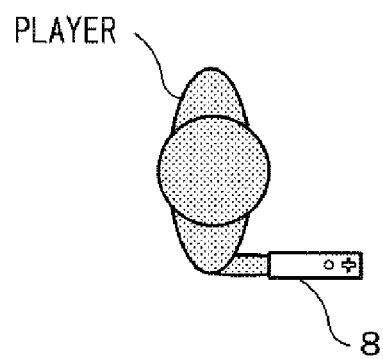

INPUT DEVICE ATTITUDE PREDICTION

CROSS REFERENCE TO RELATED APPLICATION

The disclosure of Japanese Patent Application No. 2008-180604, filed Jul. 10, 2008, is incorporated herein by reference.

BACKGROUND OF THE INVENTION

1. Field example embodiments of the present invention relate to an information processing program for causing a computer of an information processing apparatus to detect an attitude of an input device itself equipped with a motion detection sensor and reflect the detected attitude on a motion of a predetermined object in a virtual space. More particularly, example embodiments of the present invention relates to a computer readable recording medium recording an information processing program for correcting a detected attitude of an input device and reflecting the resultant attitude on a motion of a predetermined object in a virtual space, and an information processing apparatus.

2. Description of the Background Art

Conventionally, there is a known attitude angle detection device for calculating an attitude angle based on a signal output from a three-axis gyro or a three-axis accelerometer. The attitude angle detection device has a problem that excess acceleration occurring during acceleration or deceleration or turning would cause an error in a calculated attitude angle. Therefore, the attitude angle detection device equipped with a speed sensor has been disclosed (see, for example, Japanese Laid-Open Patent Publication No. 2004-132769). In this attitude angle detection device, an error as described above is corrected by using a speed signal output from the speed sensor so as to calculate an attitude angle.

However, attitude angle detection devices as described above have the following problem. Specifically, in the attitude angle detection devices described above, whereas an attitude angle can be accurately calculated during acceleration or deceleration or turning, a three-axis accelerometer and, further, a speed sensor are required as compared to when only a three-axis gyro is used to calculate an attitude angle. Therefore, they are disadvantageous in terms of the cost effectiveness thereof.

SUMMARY OF THE INVENTION

Therefore, an aspect of example embodiments of the present invention is to provide an information processing program and an information processing apparatus that are capable of accurately calculating an attitude from a gyro signal and are advantageous in terms of cost effectiveness.

The example embodiments of the present invention have the following features. Note that reference numerals, additional descriptions and the like inside parentheses in this section indicate correspondence to embodiments described below for the sake of easy understanding, and do not limit the present invention.

A first aspect of example embodiments of the present invention is directed to A computer readable recording medium recording an information processing program that is executed by a computer of an information processing apparatus for performing a predetermined information process based on a motion detection signal output from an input device including a motion detection sensor for detecting its own motion. The program causes the computer to function as a first attitude calculation means (S2), a motion calculation means (S21), an approaching operation determination means (S22 to S24), an input attitude setting means (S27, S28, S4), and a process execution means (S5). The first attitude calculation means repeatedly calculates a first attitude indicating an attitude of the input device based on the motion detection signal. The motion calculation means calculates a motion of the first attitude based on the first attitude repeatedly calculated by the first attitude calculation means. The approaching operation determination means determines whether or not the first attitude is performing a motion of approaching the predetermined attitude, based on the motion of the first attitude calculated by the motion calculation means. The input attitude setting means sets, as an input attitude, an attitude obtained by correcting the first attitude so that the first attitude coincides with or approaches the predetermined attitude direction if the first attitude is performing the motion of approaching the predetermined attitude, or sets the first attitude as an input attitude if the first attitude is not performing the motion of approaching the predetermined attitude. The process execution means performs a predetermined information process based on the input attitude.

According to the first aspect, an attitude calculated from the input device can be corrected with high accuracy without causing the user to feel unnaturalness.

In a second aspect based on the first aspect, the motion calculation means includes a movement vector calculation means for calculating a movement vector of the first attitude based on a change in the first attitude repeatedly calculated by the first attitude calculation means. The approaching operation determination means determines whether or not the motion of the first attitude is the motion of approaching the predetermined attitude, based on the movement vector.

According to the second aspect, the movement vector is used to determine the motion of the input attitude. Therefore, the determination process is facilitated, resulting in a reduction in process load.

In a third aspect based on the second aspect, the information processing program further causes the computer to function as a second attitude calculation means for calculating a second attitude that is a predetermined attitude related to the first attitude, and the second attitude is used as the predetermined attitude.

In a fourth aspect based on the third aspect, the second attitude calculation means calculates, as the second attitude, a following attitude that is an attitude that gradually approaches the first attitude.

According to the third and fourth aspects, the process of determining whether the motion of the first attitude is a motion of approaching the second attitude can be facilitated, resulting in a reduction in process load.

In a fifth aspect based on the fourth aspect, the motion calculation means includes a following vector calculation means (S22) for calculating a following vector that is a vector along which the following attitude is moved toward the first attitude. The approaching operation determination means determines whether or not the first attitude is performing the motion of approaching the second attitude, based on an angle between the movement vector and the following vector.

According to the fifth aspect, the determination process is performed based on an angle between vectors, and therefore, can be facilitated, resulting in a reduction in process load.

In a sixth aspect based on the fifth aspect, the input attitude setting means includes a fourth attitude calculation means (S42) for calculating a fourth attitude indicating the third attitude in a coordinate system where a basic attitude that is a predetermined attitude is a reference, and the input attitude setting means sets the fourth attitude as the input attitude.

According to the sixth aspect, the determination process is performed based on the inner product of vectors, and therefore, can be facilitated, resulting in a reduction in process load.

In a seventh aspect based on the first aspect, the input attitude setting means includes a third attitude calculation means (S41) for calculating a third attitude indicating the first attitude in a coordinate system where the predetermined attitude is a reference. If the first attitude is performing the motion of approaching the predetermined attitude, the input attitude setting means moves the predetermined attitude nearer to the first attitude before calculating and setting the third attitude as the input attitude, and if the first attitude is not performing the motion of approaching the predetermined attitude, the input attitude setting means calculates and sets the third attitude as the input attitude without moving the predetermined attitude.

According to the seventh aspect, the first attitude is not directly corrected, and instead, the third attitude is used as an attitude after correction (game parameter). Therefore, the first attitude before correction can be held, and can be used in other processes.

In an eighth aspect based on the seventh aspect, the input attitude setting means includes a fourth attitude calculation means (S42) for calculating a fourth attitude indicating the third attitude in a coordinate system where a basic attitude that is a predetermined attitude is a reference. The input attitude setting means sets the fourth attitude as the input attitude.

According to the eighth aspect, unnaturalness that the user feels can be further reduced.

In a ninth aspect based on the first aspect, the information processing program further causes the computer to function as a second attitude calculation means for calculating a second attitude that is a predetermined attitude related to the first attitude. The second attitude is used as the predetermined attitude.

In a tenth aspect based on the third aspect, the second attitude calculation means calculates, as the second attitude, a following attitude that is an attitude that gradually approaches the first attitude.

According to the ninth and tenth aspects, the process of determining whether or not the motion of the first attitude is a motion of approaching the second attitude can be facilitated, resulting in a reduction in process load.

An eleventh aspect of example embodiments of the present invention is directed to A computer readable recording medium recording an information processing program that is executed by a computer of an information processing apparatus for performing a predetermined information process based on a motion detection signal output from an input device including a motion detection sensor for detecting its own motion. The program causes the computer to function as an attitude calculation means (S2) for repeatedly calculating an input attitude indicating an attitude of the input device based on the motion detection signal, a rotation direction calculation means (S57) for calculating a rotation direction of the input attitude about a predetermined axis based on the input attitude repeatedly calculated by the input attitude calculation means, an input attitude correction means (S58) for correcting the input attitude so that the rotation direction of the input attitude coincides with or approaches a predetermined reference rotation direction, and a process execution means (S59) for performing a predetermined information process based on the input attitude corrected by the input attitude correction means.

According to the eleventh aspect, an attitude calculated from the input device can be corrected with high accuracy without causing the user to feel unnaturalness.

In a twelfth aspect based on the eleventh aspect, the rotation direction calculation means includes a rotation axis calculation means (S78) for calculating a rotation axis about which the input attitude is rotated, from the input attitude repeatedly calculated by the input attitude calculation means. The input attitude correction means corrects the input attitude so that the rotation axis calculated by the rotation axis calculation means coincides with or approaches the rotation axis of the predetermined reference rotation direction.

According to the twelfth aspect, the input attitude can be corrected without causing the player to feel unnaturalness, and the corrected input attitude can be used in a game process.

In a thirteenth aspect based on the twelfth aspect, the rotation axis calculation means includes an input rotation axis calculation means (S74 to S77) for calculating input rotation axes orthogonal to successive input attitudes in time series repeatedly calculated by the input attitude calculation means, and an average rotation axis calculation means (S78) for calculating an average rotation axis that is an average of the input rotation axes calculated by the input rotation axis calculation means. The average rotation axis calculated by the average rotation axis calculation means is a rotation axis for rotation of the input attitude.

According to the thirteenth aspect, the rotation axis of the input attitude can be corrected without causing the player to feel unnaturalness.

In the fourteenth aspect based on the twelfth aspect, the information processing program further causes the computer to function as a forward vector calculation means (S81) for calculating a forward vector indicating a forward direction of the input device, where the forward vector is indicated as an outer product of a vector indicating the rotation axis calculated by the rotation axis calculation means and a right-above vector that is a vector indicating a right-above direction. The input attitude correction means corrects the input attitude so that the forward vector calculated by the forward vector calculation means coincides with or approaches the predetermined reference rotation direction.

According to the fourteenth aspect, a direction of the input attitude is corrected to a predetermined direction without causing the player to feel unnaturalness, and the direction of the input attitude can be used in a game process.

In a fifteenth aspect based on the eleventh aspect, the information processing program further causes the computer to function as an approximation calculation means for calculating an approximation between a rotation direction of the input attitude and a direction that rotates about an axis perpendicular to a plumb line. The input attitude correction means performs correction, depending on the approximation calculated by the approximation calculation means.

According to the fifteenth aspect, a direction of an attitude calculated from the input device can be corrected to perform an information process without causing the user to feel unnaturalness.

A sixteenth aspect of example embodiments of the present invention is directed to an information processing apparatus (3) for performing a predetermined information process based on a motion detection signal output from an input device (5) including a motion detection sensor for detecting its own motion, comprising a first attitude calculation means (10), a motion calculation means (10) an approaching operation determination means (10), an input attitude setting means (10), and a process execution means (10). The first attitude calculation means repeatedly calculates a first attitude indicating an attitude of the input device based on the motion detection signal. The motion calculation means calculates a motion of the first attitude based on the first attitude repeatedly calculated by the first attitude calculation means. The approaching operation determination means determines whether or not the first attitude is performing a motion of approaching the predetermined attitude, based on the motion of the first attitude calculated by the motion calculation means. The input attitude setting means sets, as an input attitude, an attitude obtained by correcting the first attitude so that the first attitude coincides with or approaches the predetermined attitude direction if the first attitude is performing the motion of approaching the predetermined attitude, or sets the first attitude as an input attitude if the first attitude is not performing the motion of approaching the predetermined attitude. The process execution means performs a predetermined information process based on the input attitude.

According to the sixteenth aspect, an effect similar to that of the first aspect can be obtained.

A seventeenth aspect of example embodiments of the present invention is directed to an information processing apparatus (3) for performing a predetermined information process based on a motion detection signal output from an input device (5) including a motion detection sensor for detecting its own motion, comprising an attitude calculation means (10), a rotation direction calculation means (10), an input attitude correction means (10), and a process execution means (10). The attitude calculation means repeatedly calculates an input attitude indicating an attitude of the input device based on the motion detection signal. The rotation direction calculation means calculates a rotation direction of the input attitude about a predetermined axis based on the input attitude repeatedly calculated by the input attitude calculation means. The input attitude correction means corrects the input attitude so that the rotation direction of the input attitude coincides with or approaches the predetermined reference rotation direction. The process execution means performs a predetermined information process based on the input attitude corrected by the input attitude correction means.

According to the seventeenth aspect, an effect similar to that of the first aspect can be obtained.

According to example embodiments of the present invention, for example, even if the input device includes only a gyro sensor, the attitude of the input device can be corrected with such high accuracy that the user does not feel unnaturalness.

These and other features, aspects and advantages of example embodiments of the present invention will become more apparent from the following detailed description of example embodiments of the present invention when taken in conjunction with the accompanying drawings.

BRIEF DESCRIPTION OF THE DRAWINGS

FIG. 17 is a flowchart showing a detail of a following attitude calculation process of step S3 of FIG. 16;
FIG. 20 is a diagram for describing a second embodiment;
FIG. 21 is a diagram for describing the second embodiment.

DESCRIPTION OF THE NON-LIMITING EXAMPLE EMBODIMENTS

Hereinafter, example embodiments of the present invention will be described with reference to the accompanying drawings. Note that the present invention is not limited to these examples.

(Whole Configuration of Game System)

Figure 1:
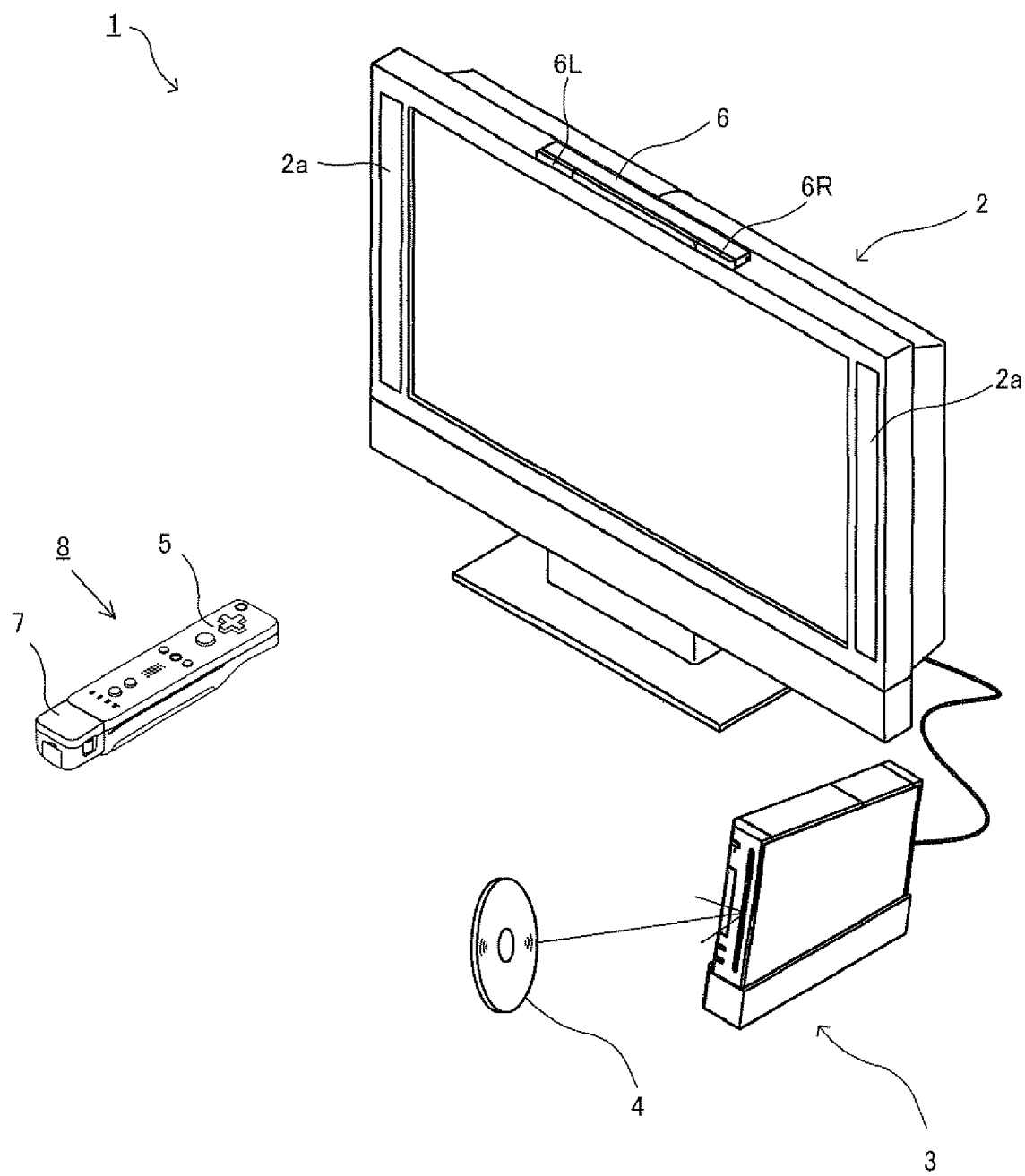
FIG. 1 is an external view of a game system 1.

A game system 1 including a game apparatus that is an attitude calculation device according to an example embodiment of the present invention will be described with reference to FIG. 1. FIG. 1 is an external view of the game system 1. Hereinafter, the game apparatus of this embodiment and a game program will be described, where the game apparatus is a stationary game apparatus as an example. In FIG. 1, the game system 1 includes a television set (hereinafter simply referred to as a "television") 2, the game apparatus 3, an optical disc 4, an input device 8, and a marker unit 6. In the game system 1, the game apparatus 3 executes a game process based on a game operation using the input device 8.

The optical disc 4, which is an exemplary information storing medium changeable with respect to the game apparatus 3, is detachably loaded into the game apparatus 3. A game program that is executed in the game apparatus 3 is stored on the optical disc 4. On a front surface of the game apparatus 3, a slot through which the optical disc 4 is loaded or unloaded is provided. The game apparatus 3 executes a game process by reading and executing the game program stored on the optical disc 4 which has been loaded through the slot.

The television 2 as an exemplary display device is connected via a connection cord to the game apparatus 3. The television 2 displays a game image that is obtained as a result of the game process executed in the game apparatus 3. The maker unit 6 is provided in the vicinity of the screen of the television 2 (on an upper side of the screen in FIG. 1). The maker unit 6 comprises two markers 6R and 6L at both ends thereof. Specifically, the marker 6R is one or more infrared LEDs that output infrared light toward the front of the television 2 (the same is true of the marker 6L). The maker unit 6 is connected to the game apparatus 3, so that the game apparatus 3 can control ON/OFF of each infrared LED included in the maker unit 6.

The input device 8 is used to input, to the game apparatus 3, operation data indicating an operation that is performed with respect to the input device 8. In this embodiment, the input device 8 includes a controller 5 and a gyro sensor unit 7. In the input device 8, the gyro sensor unit 7 is detachably connected to the controller 5. The controller 5 and the game apparatus 3 are connected via wireless communication. In this embodiment, for example, the Bluetooth® technology is used for wireless communication between the controller 5 and the game apparatus 3. Note that, in other embodiments, the controller 5 and the game apparatus 3 may be connected via wired communication.

(Internal Configuration of Game Apparatus 3)

Figure 2:
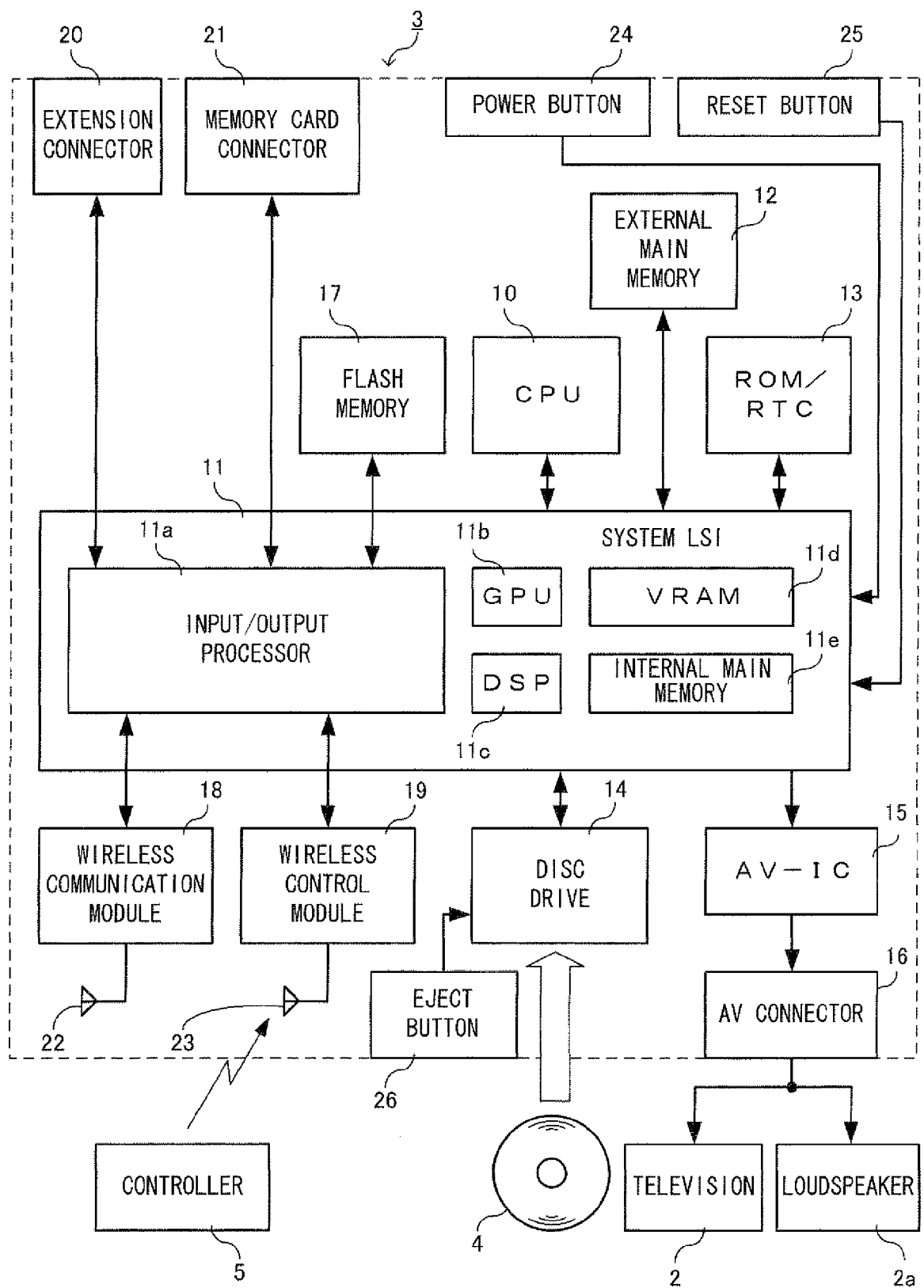
FIG. 2 is a functional block diagram of a game apparatus 3.

Next, an internal configuration of the game apparatus 3 will be described with reference to FIG. 2. Note that FIG. 2 is a block diagram showing the configuration of the game apparatus 3. The game apparatus 3 has a CPU 10, a system LSI 11, an external main memory 12, a ROM/RTC 13, a disc drive 14, an AV-IC 15, and the like.

The CPU 10 executes a game process by executing a game program stored on the optical disc 4, and serves as a game processor. The CPU 10 is connected to the system LSI 11. In addition to the CPU 10, the external main memory 12, the ROM/RTC 13, the disc drive 14, and the AV-IC 15 are connected to the system LSI 11. The system LSI 11 controls data transfer between each part connected thereto, generation of an image to be displayed, acquisition of data from an external apparatus, and the like. An internal configuration of the system LSI 11 will be described below. The volatile external main memory 12 stores a program, such as a game program read out from the optical disc 4, a game program read out from a flash memory 17, or the like, or stores various data, i.e., is used as a work area or a buffer area of the CPU 10. The ROM/RTC 13 has a ROM (so-called boot ROM) that stores a boot program for starting up the game apparatus 3, and a clock circuit (RTC: Real Time Clock) that counts time. The disc drive 14 reads out program data, texture data or the like from the optical disc 4, and writes the read data into an internal main memory 11e or the external main memory 12.

The system LSI 11 also comprises an input/output (I/O) processor 11a, a GPU (Graphics Processor Unit) 11b, a DSP (Digital Signal Processor) 11c, a VRAM 11d, and the internal main memory 11e. The parts 11a to 11e are interconnected via an internal bus (not shown).

The GPU 11b, which is a part of a drawing means, generates an image in accordance with a graphics command (drawing instruction) from the CPU 10. The VRAM 11d stores data (polygon data, texture data, etc.) required for the GPU 11b to execute the graphics command. When an image is generated, the GPU 11b produces image data using data stored in the VRAM 11d.

The DSP 11c, which functions as an audio processor, generates audio data using sound data or sound waveform (tone color) data stored in the internal main memory 11e or the external main memory 12.

The image data and audio data thus generated are read out by the AV-IC 15. The AV-IC 15 outputs the read image data via an AV connector 16 to the television 2 and the read audio data to a loudspeaker 2a included in the television 2. Thereby, sound is output from the loudspeaker 2a while an image is displayed on the television 2.

The input/output processor 11a transmits and receives data to and from parts connected thereto, and also downloads data from an external apparatus. The input/output processor 11a is connected to the flash memory 17, a wireless communications module 18, a wireless controller module 19, an extension connector 20, and a memory card connector 21. An antenna 22 is connected to the wireless communications module 18, and an antenna 23 is connected to the wireless controller module 19.

The input/output processor 11a is connected via the wireless communications module 18 and the antenna 22 to a network, which allows the input/output processor 11a to communicate with other game apparatuses or other servers connected to the network. The input/output processor 11a regularly accesses the flash memory 17 to detect the presence or absence of data that needs to be transmitted to the network, and when such data is present, outputs the data via the wireless communications module 18 and the antenna 22 to the network. The input/output processor 11a also receives data transmitted from another game apparatus or data downloaded from a download server, via the network, the antenna 22 and the wireless communications module 18, and stores the received data into the flash memory 17. The CPU 10 executes a game program to read out data from the flash memory 17 and uses the data in the game program. In the flash memory 17, save data (result data or intermediate data of a game) of a game that a user plays using the game apparatus 3 may be stored in addition to data that the game apparatus 3 transmits and receives to and from other game apparatuses or other servers.

The input/output processor 11a also receives operation data transmitted from the controller 5, via the antenna 23 and the wireless controller module 19, and stores (temporarily stores) the data into a buffer area of the internal main memory 11e or the external main memory 12.

Further, the extension connector 20 and the memory card connector 21 are connected to the input/output processor 11a. The extension connector 20 is a connector for interface, such as USB or SCSI, to which a medium (an external storage medium, etc.), a peripheral apparatus (another controller, etc.), or a wired communications connector may be connected. Communication with the network can be achieved via the wired communications connector instead of the wireless communications module 18. The memory card connector 21 is a connector for connecting an external storage medium, such as a memory card or the like. For example, the input/output processor 11a can access an external storage medium via the extension connector 20 or the memory card connector 21 to save data into or read data from the external storage medium.

The game apparatus 3 comprises a power button 24, a reset button 25, and an eject button 26. The power button 24 and the reset button 25 are connected to the system LSI 11. When the power button 24 is turned ON, power is supplied via an AC adaptor (not shown) to each part of the game apparatus 3. When the reset button 25 is pressed, the system LSI 11 restarts up the boot program of the game apparatus 3. The eject button 26 is connected to the disc drive 14. When the eject button 26 is pressed, the optical disc 4 is ejected from the disc drive 14.

(Configuration of Input Device 8)

Figure 3:
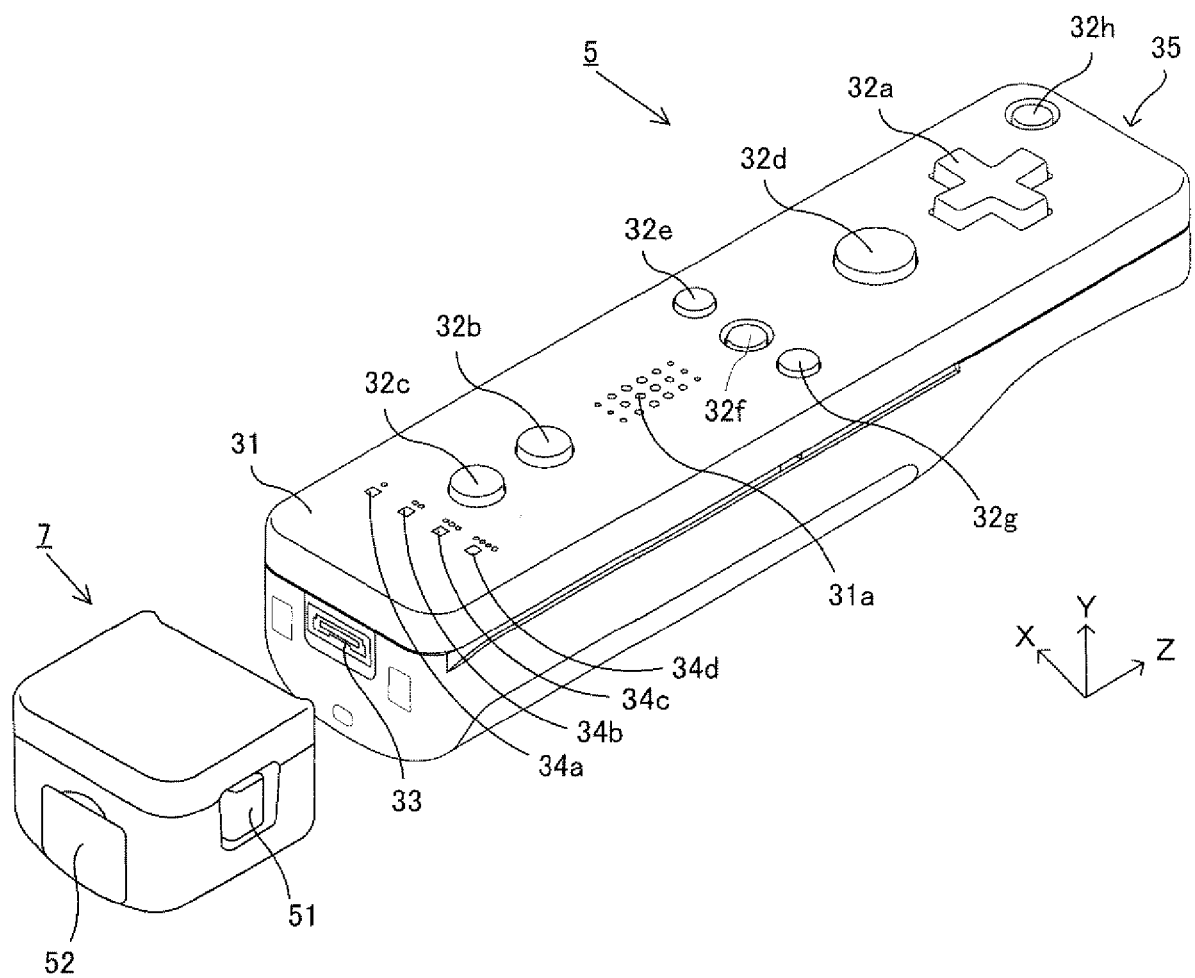
FIG. 3 is a perspective view showing an external configuration of an input device 8.
Figure 4:
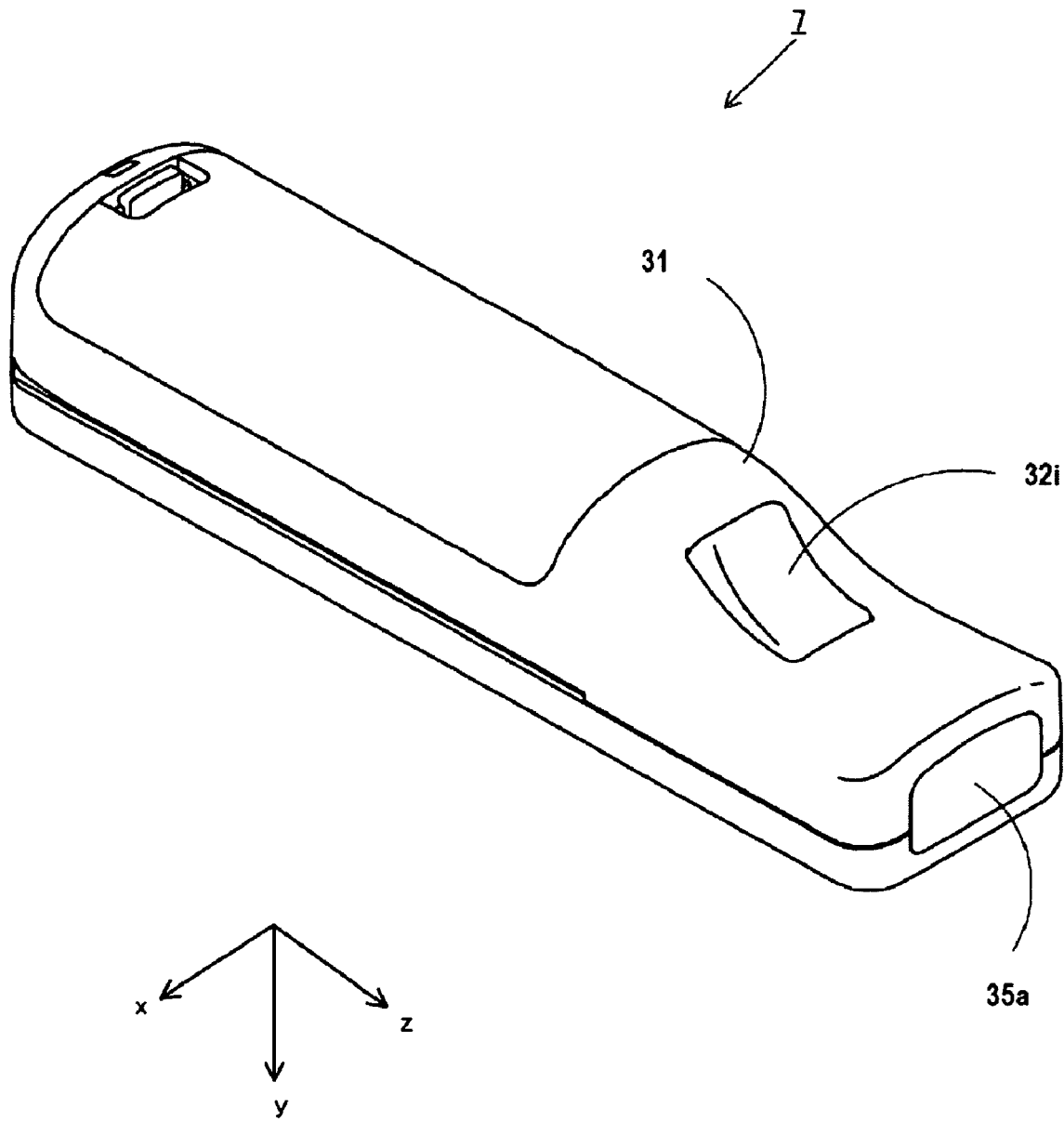
FIG. 4 is a perspective view showing an external configuration of a controller 5.

Next, the input device 8 will be described with reference to FIGS. 3 to 6. FIG. 3 is a perspective view showing an external appearance or configuration of the input device 8. FIG. 4 is a perspective view showing an external appearance or configuration of the controller 5. FIG. 3 is a perspective view of the controller 5 as viewed from the top and the rear. FIG. 4 is a perspective view of the controller 5 as viewed from the bottom and the front.

In FIGS. 3 and 4, the controller 5 has a housing 31 which is formed by, for example, plastic molding. The housing 31 is in the shape of substantially a rectangular parallelepiped where a front-to-rear direction (the Z-axis direction in FIG. 3) is a longitudinal direction. The whole housing 31 has a size that enables an adult and a child to hold the controller 5 with one hand. A player performs a game operation by pressing down a button provided on the controller 5, and moving the controller 5 itself to change a position or an attitude of the controller 5.

The housing 31 is provided with a plurality of operation buttons. As illustrated in FIG. 3, a cross button 32a, a first button 32b, a second button 32c, an A-button 32d, a minus button 32e, a home button 32f, a plus button 32g, and a power button 32h are provided on an upper surface of the housing 31. The upper surface of the housing 31 on which these buttons 32a to 32h are provided may be referred to as a "button surface". On the other hand, as illustrated in FIG. 4, a hollow portion is formed on a lower surface of the housing 31. A B-button 32i is provided on a rear slope surface of the hollow portion. These operation buttons 32a to 32i are assigned respective functions depending on a game program executed by the game apparatus 3 as appropriate. The power button 32h is used to remotely power ON/OFF the main body of the game apparatus 3. Upper surfaces of the home button 32f and the power button 32h are buried below the upper surface of the housing 31. Thereby, the player is prevented from unintentionally and erroneously pressing down the home button 32f and the power button 32h.

A connector 33 is provided on a rear surface of the housing 31. The connector 33 is used to connect the controller 5 with other devices (e.g., a gyro sensor unit 7, another controller, etc.). An engaging hole 33a is provided in both sides of the connector 33 in the rear surface of the housing 31 so as to prevent the other device from being easily detached from the housing 31.

A plurality of LEDs 34a to 34d (four LEDs in FIG. 3) are provided at a rear portion of the upper surface of the housing 31. Here, the controller 5 is assigned controller identification (number) so as to distinguish it from other controllers. The LEDs 34a to 34d are used so as to notify the player of the controller identification currently set for the controller 5, the state of charge of a battery in the controller 5, or the like. Specifically, when a game operation is performed using the controller 5, any one of the LEDs 34a to 34d is turned ON, depending on the controller identification.

Figure 6:
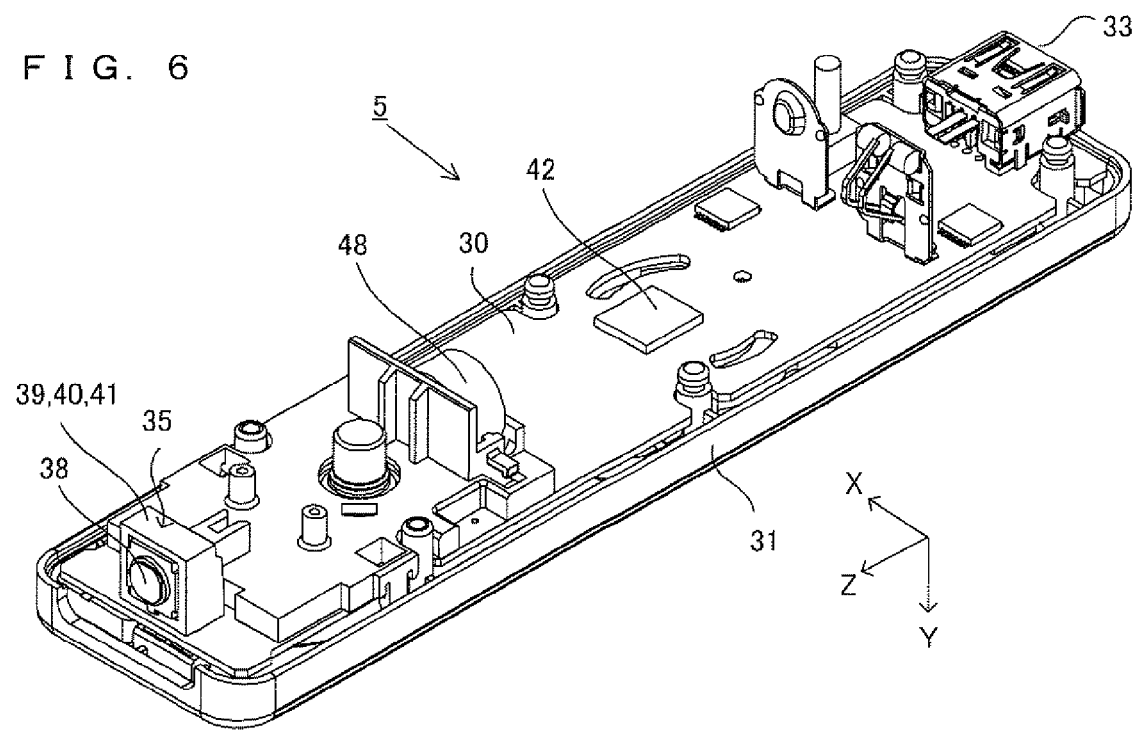
FIG. 6 is a diagram showing an internal structure of the controller 5.

The controller 5 has an image capture information computing section 35 (FIG. 6). As illustrated in FIG. 4, a light incident surface 35a for the image capture information computing section 35 is provided on a front surface of the housing 31. The light incident surface 35a is made of a material that can transmit at least infrared light from the markers 6R and 6L.

Also, sound holes 31a through which sound from a loudspeaker 49 (FIG. 5) included in the controller 5 is emitted to the outside, are formed between the first button 32b and the home button 32f on the upper surface of the housing 31.

Figure 5:
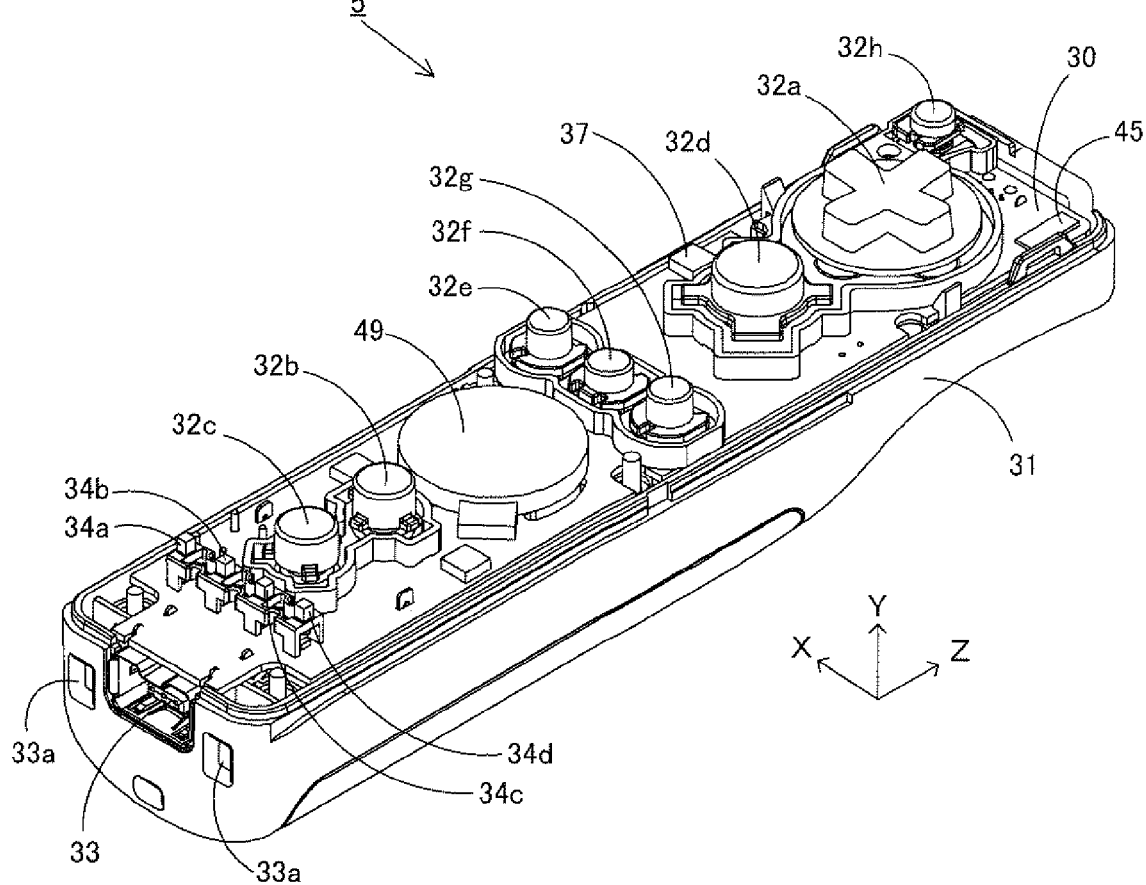
FIG. 5 is a diagram showing an internal structure of the controller 5.

Next, an internal structure of the controller 5 will be described with reference to FIGS. 5 and 6. FIGS. 5 and 6 are diagrams showing the internal structure of the controller 5. Note that FIG. 5 is a perspective view of the controller 5 where an upper housing (a portion of the housing 31) is removed. FIG. 6 is a perspective view of the controller 5 where a lower housing (a portion of the housing 31) is removed. FIG. 6 illustrates a perspective view of a base board 30 of FIG. 5 as viewed from a bottom surface thereof.

In FIG. 5, the base board 30 is fixed inside the housing 31. On an upper major surface of the base board 30, the operation buttons 32a to 32h, the LEDs 34a to 34d, an acceleration sensor 37, an antenna 45, the loudspeaker 49, and the like are provided. These are connected to a microcomputer 42 (see FIG. 6) via conductors (not shown) formed on the base board 30 and the like. In this embodiment, the acceleration sensor 37 is positioned away from a center of the controller 5 in the X-axis direction, thereby facilitating calculation of a motion of the controller 5 when the controller 5 is rotated about the Z axis. The acceleration sensor 37 is provided farther forward than the center of the controller 5 in the longitudinal direction (Z-axis direction). A radio module 44 (FIG. 6) and the antenna 45 enable the controller 5 to function as a wireless controller.

On the other hand, in FIG. 6, the image capture information computing section 35 is provided at a front edge on a lower major surface of the base board 30. The image capture information computing section 35 comprises an infrared filter 38, a lens 39, an image capturing device 40, and an image processing circuit 41, which are arranged in this order from the front of the controller 5. These members 38 to 41 are attached on the lower major surface of the base board 30.

The microcomputer 42 and a vibrator 48 are provided on the lower major surface of the base board 30. The vibrator 48 may be, for example, a vibration motor or a solenoid. The vibrator 48 is connected to the microcomputer 42 via a conductor formed on the base board 30 and the like. The activation of the vibrator 48, which is instructed by the microcomputer 42, generates vibration in the controller 5. Thereby, the vibration is transferred to a user's hand holding the controller 5, thereby making it possible to achieve a so-called vibration-feature supporting game. In this embodiment, the vibrator 48 is disposed somehow closer to the front of the housing 31, i.e., the vibrator 48 is placed closer to the end of the controller 5 than the center of the controller 5 is. Therefore, the vibration of the vibrator 48 significantly vibrates the whole controller 5. The connector 33 is attached to a rear edge on the major lower surface of the base board 30. Note that, in addition to the parts of FIGS. 5 and 6, the controller 5 comprises a quartz oscillator for generating a basic clock for the microcomputer 42, an amplifier for outputting an audio signal to the loudspeaker 49, and the like.

The gyro sensor unit 7 has a gyro sensor (gyro sensors 55 and 56 shown in FIG. 7) for detecting angular speeds about three axes. The gyro sensor unit 7 is detachably attached to the connector 33 of the controller 5. A plug (a plug 53 shown in FIG. 7) that can be connected to the connector 33 is provided at a front end (an end portion in the positive direction of the Z axis of FIG. 3) of the gyro sensor unit 7. A hook (not shown) is provided on both sides of the plug 53. When the gyro sensor unit 7 is attached to the controller 5, the plug 53 is connected to the connector 33 while the hook is engaged with the engaging hole 33a of the controller 5. Thereby, the controller 5 and the gyro sensor unit 7 are firmly fixed to each other. The gyro sensor unit 7 also has a button 51 on a side surface (a surface in the X-axis direction of FIG. 3) thereof. The button 51 is configured so that when it is pressed down, the engaged state of the hook with the engaging hole 33a is canceled. Therefore, by pulling the plug 53 out of the connector 33 while pressing down the button 51, the gyro sensor unit 7 can be detached from the controller 5.

A connector having the same shape as that of the connector 33 is provided at a rear end of the gyro sensor unit 7. Therefore, other devices that can be attached to the controller 5 (particularly, the connector 33 thereof), can also be attached to the connector of the gyro sensor unit 7. Note that, in FIG. 3, a cover 52 is detachably attached to the connector.

Note that the shapes of the controller 5 and the gyro sensor unit 7, the shape of each operation button, the numbers and arrangements of acceleration sensors and vibrators, and the like of FIGS. 3 to 6 are only for illustrative purposes. The example embodiments of the present invention can be implemented using other shapes, numbers and arrangements. Although the image capture direction of the image capture means is assumed to be the positive Z-axis direction in this embodiment, the image capture direction may be any direction. In other words, the image capture information computing section 35 (the light incident surface 35a of the image capture information computing section 35) in the controller 5 may not be positioned on the front surface of the housing 31, and may be provided on other surfaces as long as it can capture light from the outside of the housing 31.

Figure 7:
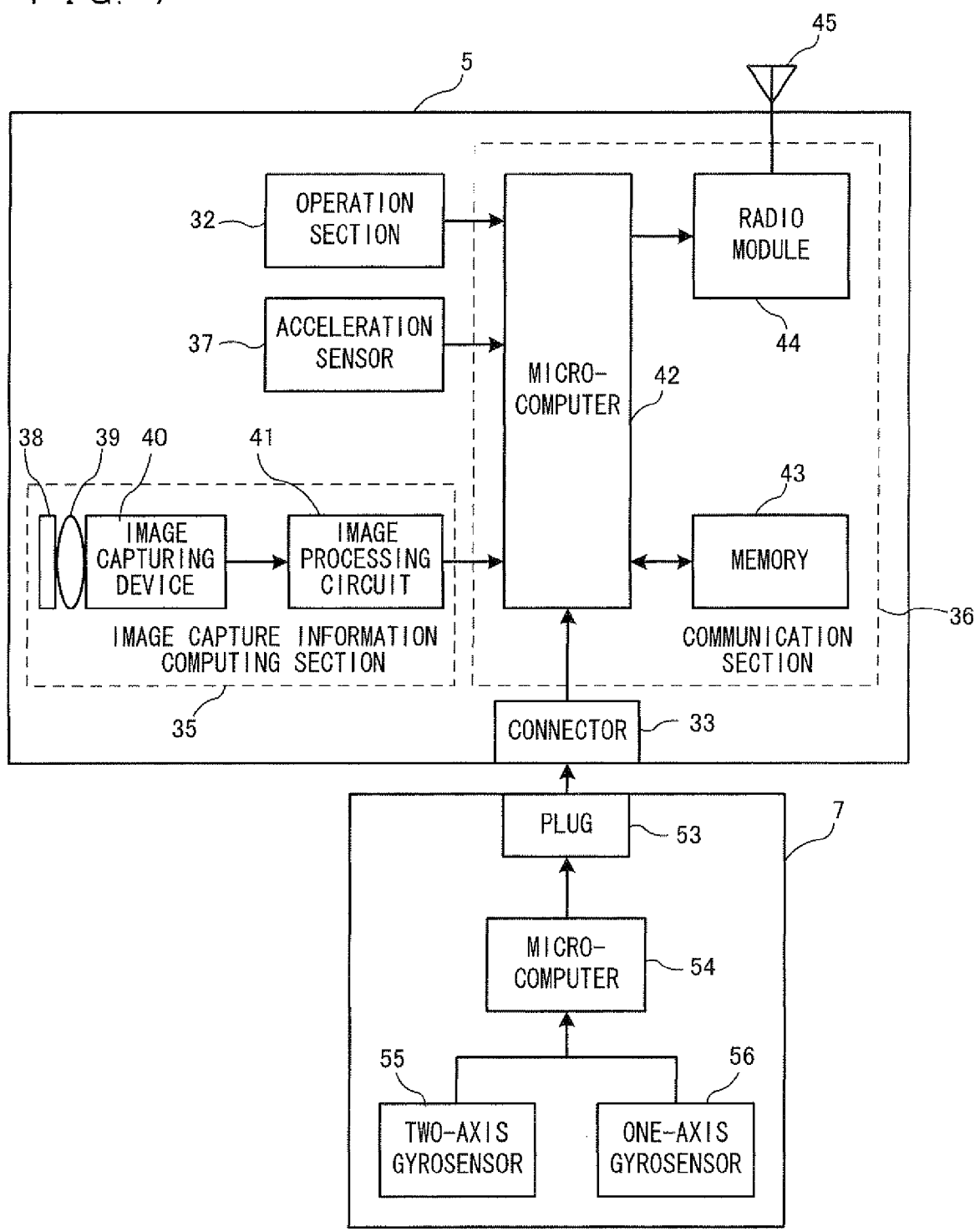
FIG. 7 is a block diagram showing a configuration of the input device 8.

FIG. 7 is a block diagram showing a configuration of the input device (the controller 5 and the gyro sensor unit 7). The controller 5 comprises an operation section 32 (the operation buttons 32a to 32i), the connector 33, the image capture information computing section 35, a communications section 36, and the acceleration sensor 37. The controller 5 transmits data indicating an operation which has been performed with respect to itself, as operation data, to the game apparatus 3.

The operation section 32 includes the operation buttons 32a to 32i, and outputs operation button data indicating an input state of each of the operation buttons 32a to 32i (whether or not each of the operation buttons 32a to 32i has been pressed down) to the microcomputer 42 of the communications section 36.

The image capture information computing section 35 is a system for analyzing image data captured by an image capturing means to determine a region having a high luminance in the image data, thereby detecting a center-of-gravity position, a size or the like of the region. The image capture information computing section 35 has, for example, a maximum sampling cycle of about 200 frames/sec, and therefore, can track and analyze a relatively high-speed motion of the controller 5.

The image capture information computing section 35 includes the infrared filter 38, the lens 39, the image capturing device 40, and the image processing circuit 41. The infrared filter 38 passes only infrared light entering from the front of the controller 5. The lens 39 collects infrared light passing through the infrared filter 38 and causes the light to enter the image capturing device 40. The image capturing device 40 may be, for example, a solid-state image capturing device, such as a CMOS sensor or a CCD sensor, receives infrared light collected by the lens 39, and outputs an image signal. Here, the markers 6R and 6L of the marker unit 6 provided in the vicinity of the display screen of the television 2 are each made of an infrared LED that outputs infrared light toward the front of the television 2. Therefore, by providing the infrared filter 38, the image capturing device 40 captures only infrared light passing through the infrared filter 38 to generate image data. Thereby, images of the markers 6R and 6L can be more correctly captured.

Hereinafter, the image captured by the image capturing device 40 is referred to as a captured image. The image data generated by the image capturing device 40 is processed by the image processing circuit 41. The image processing circuit 41 calculates a position of a target object (the markers 6R and 6L) in the captured image. The image processing circuit 41 outputs coordinates indicating the calculated position to the microcomputer 42 of the communications section 36. The coordinate data is transmitted as operation data by the microcomputer 42 to the game apparatus 3. Hereinafter, the coordinates are referred to as "marker coordinates". The marker coordinates vary, depending on a direction (tilt angle) or a position of the controller 5 itself. Therefore, the game apparatus 3 can use the marker coordinates to calculate the direction or position of the controller 5.

The acceleration sensor 37 detects an acceleration (including a gravity acceleration) of the controller 5, i.e., detects a force (including gravity) applied to the controller 5. Of accelerations applied to a detection portion of the acceleration sensor 37, the acceleration sensor 37 detects a value of an acceleration (linear acceleration) in a linear direction along a sensing-axis direction. For example, in the case of a multi-axis acceleration sensor having two or more axes, an acceleration component along each axis is detected as an acceleration applied to the detection portion of the acceleration sensor. For example, a three- or two-axis acceleration sensor may be available from Analog Devices, Inc. or STMicroelectronics N.V. Although the acceleration sensor 37 is here assumed to be of a capacitance type, other types of acceleration sensors may be used.

In this embodiment, the acceleration sensor 37 detects a linear acceleration along each of three axes extending in a vertical direction (Y-axis direction in FIG. 3), a lateral direction (X-axis direction in FIG. 3), and a front-to-rear direction (Z-axis direction in FIG. 3), where the controller 5 is used as a reference. Since the acceleration sensor 37 detects an acceleration with respect to a linear direction along each axis, an output of the acceleration sensor 37 indicates a value of a linear acceleration along each axis. In other words, the detected acceleration is represented as a three-dimensional vector (ax, ay, az) in an XYZ coordinate system (controller coordinate system) provided where the controller 5 is a reference. Hereinafter, a three-dimensional vector is represented by <an X-axis component, a Y-axis component, a Z-axis component>, e.g., <1, 0, 1>. Also, hereinafter, a vector having, as components thereof, acceleration values with respect to the three axes which are detected by the acceleration sensor 37 is referred to as an acceleration vector.

Data (acceleration data) indicating an acceleration detected by the acceleration sensor 37 is output to the communications section 36. In this embodiment, the acceleration sensor 37 is used to output data for determining the tilt angle of the controller 5.

It would be easily understood by those skilled in the art from the description of the present specification that additional information about the controller 5 can be estimated or calculated (determined) by a computer, such as a processor (e.g., the CPU 10) of the game apparatus 3, a processor (e.g., the microcomputer 42) of the controller 5, or the like, performing a process based on an acceleration signal output from the acceleration sensor 37. For example, the computer may execute a process, assuming that the controller 5 including the acceleration sensor 37 is in the static state (i.e., the acceleration sensor 37 detects only the acceleration of gravity). In this case, when the controller 5 is actually in the static state, it can be determined whether or not or how much the attitude of the controller 5 is tilted with respect of the direction of gravity based on the detected acceleration. Specifically, with reference to a state in which the detection axis of the acceleration sensor 37 is directed vertically downward, it can be determined whether or not 1 G (acceleration of gravity) is applied to the controller 5. Also, based on the magnitude of the acceleration, it can be determined how much the controller 5 is tilted. If the acceleration sensor 37 is of the multi-axis type, it can be determined in more detail how much the controller 5 is tilted with respect to the direction of gravity, by processing an acceleration signal for each axis. In this case, the processor may calculate a tilt angle of the controller 5 based on an output of the acceleration sensor 37, or may calculate a tilt direction of the controller 5 without calculating the tilt angle. Thus, the tilt angle or attitude of the controller 5 can be determined using a combination of the acceleration sensor 37 and the processor.

On the other hand, when the controller 5 is assumed to be in a dynamic state (a state in which the controller 5 is being operated), the acceleration sensor 37 detects an acceleration corresponding to a motion of the controller 5 in addition to the acceleration of gravity. Therefore, a direction of the motion of the controller 5 can be determined by removing the acceleration-of-gravity component from the detected acceleration by a predetermined process. Even when the controller 5 is assumed to be in the dynamic state, the tilt of the controller 5 with respect to the direction of gravity can be determined by removing an acceleration component corresponding to a motion of the acceleration sensor 37 from the detected acceleration by a predetermined process. In other examples, the acceleration sensor 37 may comprise a built-in processing apparatus or another type of dedicated apparatus for performing a predetermined process with respect to an acceleration signal detected by a built-in acceleration detecting means before outputting the acceleration signal to the microcomputer 42. The built-in or dedicated processing apparatus, when used to, for example, detect a static acceleration (e.g., the acceleration of gravity) of the acceleration sensor 37, may convert the acceleration signal into a tilt angle (alternatively, another preferable parameter).

Although an acceleration sensor that is, for example, of a capacitance type is used as a sensor for outputting a value varying depending on a motion of a controller, other types of acceleration sensors may be used.

The communication section 36 includes the microcomputer 42, a memory 43, the radio module 44, and the antenna 45. The microcomputer 42 controls the radio module 44 which wirelessly transmits data obtained by the microcomputer 42 to the game apparatus 3 while using the memory 43 as a memory area during a process. The microcomputer 42 is also connected to the connector 33. Data transmitted from the gyro sensor unit 7 is input via the connector 33 to the microcomputer 42. Hereinafter, a configuration of the gyro sensor unit 7 will be described.

The gyro sensor unit 7 comprises the plug 53, a microcomputer 54, a two-axis gyro sensor 55, and a one-axis gyro sensor 56. As described above, the gyro sensor unit 7 detects angular speeds about three axes (the X, Y and Z axes in this embodiment), and transmits data indicating the detected angular speeds (angular speed data) to the controller 5.

The two-axis gyro sensor 55 detects an angular speed about the X axis and an angular speed (per unit time) about the Y axis. The one-axis gyro sensor 56 detects an angular speed (per unit time) about the Z axis. Note that rotation directions about the X, Y and Z axes, where the image capture direction (the positive Z-axis direction) of the controller 5 are herein referred to as a roll direction, a pitch direction and a yaw direction. Specifically, the two-axis gyro sensor 55 detects angular speeds in the roll direction (a rotation direction about the X axis) and the pitch direction (a rotation direction about the Y axis), and the one-axis gyro sensor 56 detects an angular speed in the yaw direction (a rotation direction about the Z axis).

Although it has been assumed in this embodiment that the two-axis gyro sensor 55 and the one-axis gyro sensor 56 are used so as to detect angular speeds about three axes, any number or any combination of gyro sensors may be employed in other embodiments as long as angular speeds about three axes can be detected.

Also, in this embodiment, the three axes about which the gyro sensors 55 and 56 detect angular speeds are set to coincide with the three axes (the X, Y and Z axes) along which the acceleration sensor 37 detects accelerations. Note that, in other embodiments, the three axes about which the gyro sensors 55 and 56 detect angular speeds may not coincide with the three axes along which the acceleration sensor 37 detects accelerations.

Data indicating the angular speeds detected by the gyro sensors 55 and 56 is output to the microcomputer 54. Therefore, data indicating angular speeds about three axes (i.e., the X, Y and Z axes) is input to the microcomputer 54. The microcomputer 54 transmits the data indicating the angular speeds about the three axes as angular speed data via the plug 53 to the controller 5. Note that the transmission from the microcomputer 54 to the controller 5 is sequentially performed in predetermined cycles. Since a game process is typically performed in units of 1/60 sec (one frame time), transmission is preferably performed in cycles which are shorter than 1/60 sec.

Back to the description of the controller 5, data output from the operation section 32, the image capture information computing section 35, and the acceleration sensor 37 to the microcomputer 42, and data transmitted from the gyro sensor unit 7 to the microcomputer 42, are temporarily stored in the memory 43. These pieces of data are transmitted as the operation data to the game apparatus 3. Specifically, when the timing of transmission to the wireless controller module 19 of the game apparatus 3 arrives, the microcomputer 42 outputs the operation data stored in the memory 43 to the radio module 44. The radio module 44 uses, for example, the Bluetooth® technique to modulate carrier waves having a predetermined frequency with the operation data, and emits a resultant weak radio wave signal from the antenna 45. In other words, the operation data is modulated by the radio module 44 into the weak radio wave signal, which is in turn transmitted from the controller 5. The weak radio wave signal is received by the wireless controller module 19 of the game apparatus 3. By demodulation or decoding of the received weak radio wave signal, the game apparatus 3 can obtain the operation data. The CPU 10 of the game apparatus 3 performs a game process based on the obtained operation data and a game program. Note that wireless transmission from the communication section 36 to the wireless controller module 19 is sequentially executed in predetermined cycles. Since a game process is generally executed in units of 1/60 sec (one frame time), transmission is preferably performed in cycles which are shorter than 1/60 sec. For example, the communication section 36 of the controller 5 outputs the operation data to the wireless controller module 19 of the game apparatus 3 at a rate of one per 1/200 sec.

The player can perform an operation of tilting the controller 5 at any tilt angle in addition to a conventional general game operation of pressing down each operation button. In addition, the player can perform an operation of pointing any position on a screen using the controller 5 and an operation of moving the controller 5 itself.

Next, an outline of a game assumed in this embodiment will be described. The game assumed in this embodiment is a swordplay game. Specifically, as a game screen, a 3D virtual game space is drawn from a first-person viewpoint. A player object holds a sword object in the 3D virtual game space, and the sword object is drawn on the game screen of the first-person viewpoint. The controller 5 is assumed to be a sword. A player swings the controller 5 while holding it, so that the player can enjoy swinging the sword object in the virtual game space.

Figure 8:
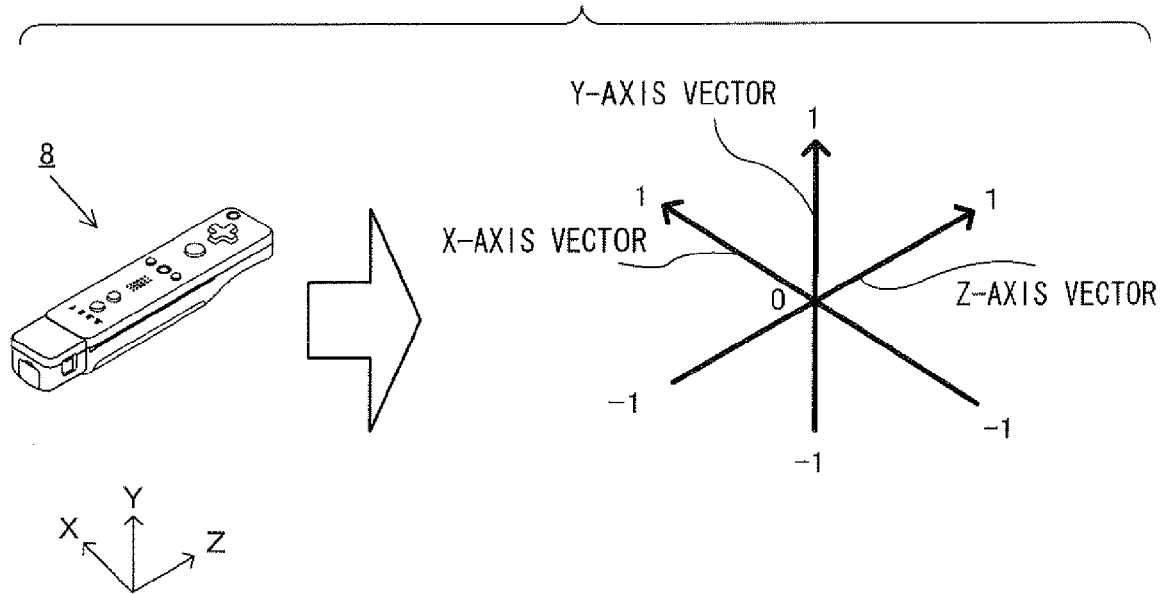
FIG. 8 is a diagram for describing the concept of three-dimensional vectors indicating an attitude of the input device 8.

In this embodiment, in order to amuse a player by assuming the input device 8 as a sword, an attitude of the sword object in the virtual game space is determined, depending on an attitude of the controller 5 that is calculated from an output of the gyro sensor unit 7. For example, when the player swings the input device 8 up and then down while holding it in the real space, the sword object in the virtual game space is also swung up and then down in association with the operation of the input device 8 (such a movement of the sword object is drawn). Here, a method for calculating the attitude of the input device 8 in this embodiment will be briefly described. In this embodiment, the attitude of the input device 8 is calculated by using a gyro sensor (the gyro sensors 55 and 56 of FIG. 7) that detects angular speeds about three axes (the X, Y and Z axes). More specifically, based on the angular speeds detected by the gyro sensor, three-dimensional vectors indicating directions of the three axes indicating a direction of the input device 8 in a space are calculated. FIG. 8 is a diagram for describing the concept of the three-dimensional vectors indicating the attitude of the input device 8, showing a state of the three-dimensional vectors corresponding to the axes (i.e., unit vectors of X, Y and Z axes in a reference coordinate system are indicated), where the front surface (a side on which light to be captured by the image capture information computing section 35 enters) of the input device 8 (the controller 5) is directed in a depth direction. In FIG. 5, assuming that each vector has a value within the range of 1 to −1, a vector for the X axis (hereinafter referred to as an X-axis vector) is represented by <1, 0, 0> in this state. A vector for the Y axis (hereinafter referred to as a Y-axis vector) is represented by <0, 1, 0>. A vector for the Z axis (hereinafter referred to as a Z-axis vector) is represented by <0, 0, 1>. The attitude of the input device 8 is calculated by combining vectors indicating these three axes. In other words, the attitude of the input device 8 is represented by the three three-dimensional vectors (the same is true of a following attitude, a relative attitude and the like described below). For example, the attitude of FIG. 8 can also be represented by an attitude matrix as follows.

$$\text{The attitude of the input device } 8 = \begin{bmatrix} 1, 0, 0 \\ 0, 1, 0 \\ 0, 0, 1 \end{bmatrix}$$

Incidentally, the attitude of the sword object as described above may be theoretically calculated directly from an output of the gyro sensor unit 7. Actually, an error occurs in the detection accuracy of the gyro sensor due to a slight deviation of a direction in which a part of the gyro sensor is attached, replacement of analog data of the sensor with a digital value having a particular number of bits, or the like. Therefore, even if an attitude calculated from the output of the gyro sensor unit 7 is directly used, a deviation gradually occurs between the actual attitude of the input device 8 and the attitude of the sword object in the virtual space. Therefore, in this embodiment, this deviation is reduced by executing a correction process described below, thereby preventing the player from feeling unnaturalness.

Figure 9:
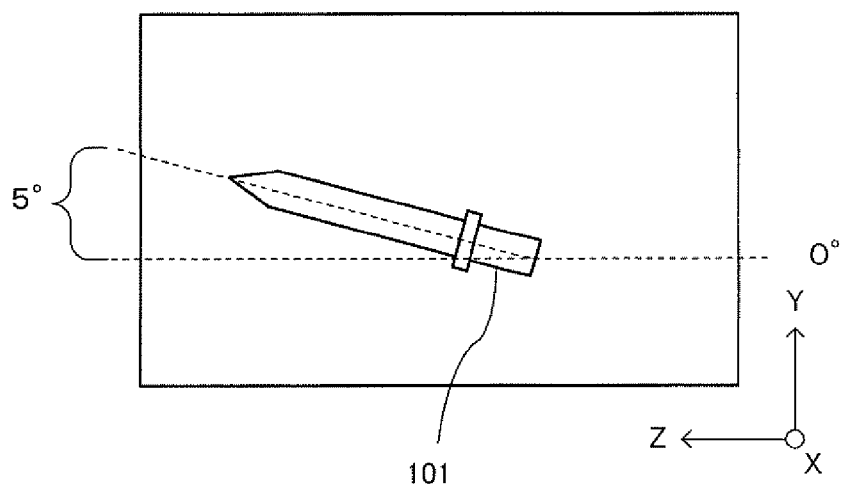
FIG. 9 is a diagram for describing a basic attitude.

Hereinafter, the correction process of this embodiment will be described. In the game of this embodiment, initially, when the correction process is executed, a "basic attitude" is defined for the sword object. The basic attitude refers to an original position or base position of the sword object, or an assumed attitude of a man or a woman holding a sword (a state in which the sword is directed to the front side and obliquely upward). Therefore, for example, when the game assumed in this embodiment is a baseball game, a bat object is used instead of a sword object, a state in which the bat object is directed upward is defined as the basic attitude. Also, when a cooking game is assumed and a frying pan object is used instead of a sword object, a state in which the frying pan object is directed to the front side is defined as the basic attitude. In this embodiment, a state in which the tip of a sword object 101 is directed upward by an angle of 5 degrees with respect to a horizontal direction (a Z-Y angle is 5 degrees) is defined as the basic attitude in the coordinate system (virtual game space) of FIG. 9. For example, it is assumed that a series of operations of swing the input device 8 up and then down are performed. In this case, only when the input device 8 is moved nearer to the basic attitude (swung down), an input value obtained from the gyro sensor unit 7 is corrected to a value that causes the sword object to be nearer to the basic attitude before a game process is performed (correction is reflected on the attitude of the sword object in the virtual space).

As described above, in this embodiment, when the input device 8 is swung as if a sword were swung, then only if the input device 8 is moved nearer to the basic attitude, an input value obtained from the gyro sensor unit 7 is corrected so that the sword object is moved more nearer to the basic attitude. Such correction is performed for the following reasons. For example, if the input value is corrected when the input device 8 is not moved (static state), the sword object in the virtual game space is moved in an amount corresponding to the correction though the input device 8 is not moved, so that the player feels unnaturalness. Also, when the input device 8 is moved away from the basic attitude (swung up), then if the input value is corrected so that the sword object is moved nearer to the basic attitude, the sword object is not moved (swung up) as much as what is expected by the player. In other words, the player would feel a poor response of the input device 8, unnaturalness, and dissatisfaction. In contrast to this, when the input device 8 is moved nearer to the basic attitude, then if the input value is corrected so that the sword object is moved more nearer to the basic attitude, the player feels "too much (swing it down too much)" or "very good response" rather than unnaturalness as described above, i.e., the player does not willingly blame the device and psychologically avoids feeling of unnaturalness. From such a viewpoint, in this embodiment, the input value is corrected only with respect to an operation of moving the input device 8 nearer to the basic attitude during a series of operations of moving the input device 8 nearer to or farther from the basic attitude (the input device 8 is swung like a sword), so that the input value is corrected without causing the player to feel unnaturalness.

Next, the concepts of various "attitudes" used in the following description (this embodiment) will be briefly described. In the following description, in addition to the above-described basic attitude, an "input attitude", a "following attitude", and a "relative attitude" are used. The input attitude refers to an attitude of the input device 8 that is calculated from the gyro sensor unit 7. In other words, the input attitude directly indicates the attitude of the input device 8. Actually, however, the input attitude does not necessarily correspond exactly to the attitude of the input device 8 due to an error in detection accuracy of the gyro sensor unit 7 described above or the like.

Figure 10:
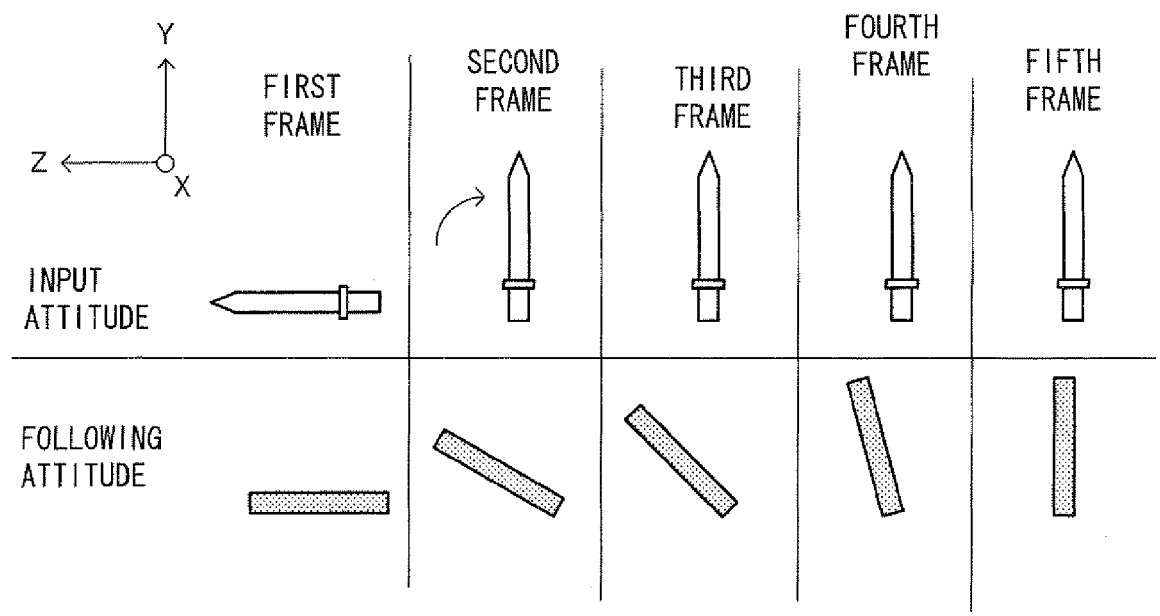
FIG. 10 is a diagram for describing basic concepts of an input attitude and a following attitude.

Next, the following attitude refers to a virtual attitude that is calculated in the process of this embodiment as appropriate, and gradually follows the input attitude. FIG. 10 is a diagram for describing basic concepts of the input attitude and the following attitude. Initially, in this embodiment, a process described below is repeatedly executed in units of one frame (1/60). Also, as an initial state, the input attitude and the following attitude are both assumed to be in a horizontal state. As shown in FIG. 10, an input attitude (a tip thereof) that is in an initial state at the first frame is assumed to be swung up by an angle of 90 degrees at the second frame. In such a case, a following attitude (a tip thereof) gradually follows (approaches) the input attitude over the first to fifth frames.

Note that, in this embodiment, only when the input attitude is moved nearer to the following attitude (hereinafter referred to as an approaching operation), a process of moving the following attitude nearer to the input attitude is performed. Conversely, when the input attitude is moved farther from the following attitude (hereinafter referred to as a leaving operation), a process of causing the following attitude not to move is performed. Also, when the input attitude is in the static state, the process of causing the following attitude not to move is performed.

Figure 11:
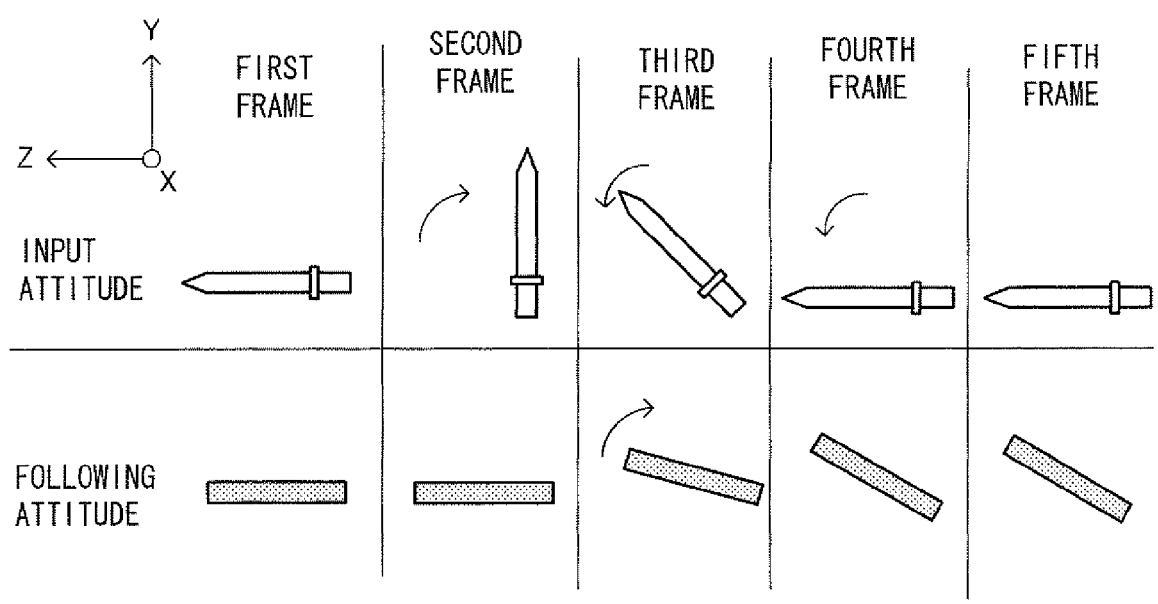
FIG. 11 is a diagram for describing a relationship between the input attitude and the following attitude in this embodiment.

In other words, only when the tip of the input attitude is moved toward the following attitude, the process of moving the following attitude nearer to the input attitude is performed. FIG. 11 is a diagram for describing a relationship between the input attitude and the following attitude in this embodiment. As shown in FIG. 11, when the input attitude is in the initial state at the first frame and is then swung up by an angle of 90 degrees at the second frame, the tip of the input attitude is located at a distance from the following attitude. In this case, the following attitude is not moved. Thereafter, at the third frame, the input attitude is slightly swung down, which means that the tip of the input attitude is moved nearer to the following attitude. In this case, the tip of the following attitude is slightly moved nearer to the input attitude. Thereafter, the input attitude is assumed to be in the horizontal state at the fourth frame. In other words, the input attitude is assumed to be moved, passing the following attitude and then leaving from the following attitude. In this case, the following attitude is not moved. In other words, when the input attitude approaches, then catches up, and then passes the following attitude, a motion of the following attitude being moved nearer to the input attitude is ended. Further, the input attitude is in the static state from the fourth frame to the fifth frame. Also in this case, the following attitude is not moved. Thus, in this embodiment, only when the input attitude is moved nearer to the following attitude, the following attitude is also moved nearer to the input attitude.

Figure 12A:
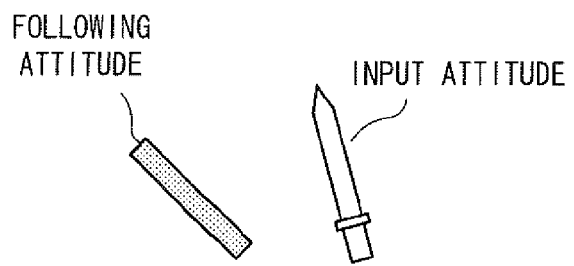
FIGS. 12A to 12D are diagrams showing the basic concept of a relative attitude.
Figure 12B:
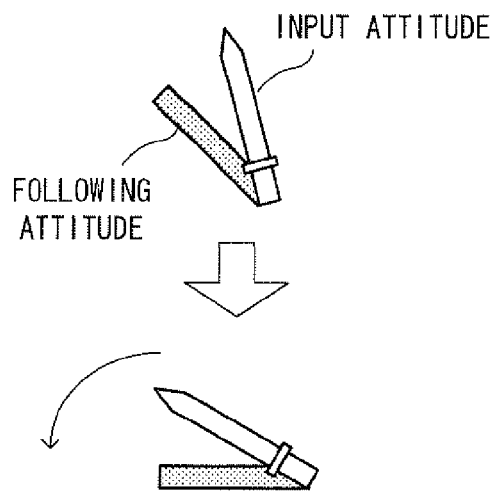
Figure 12C:
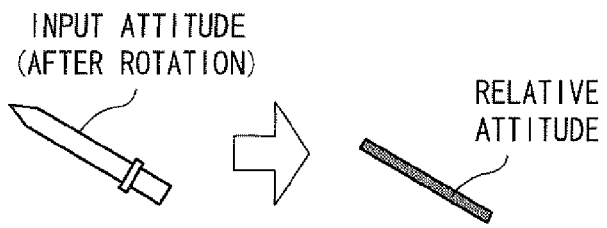
Figure 12D:
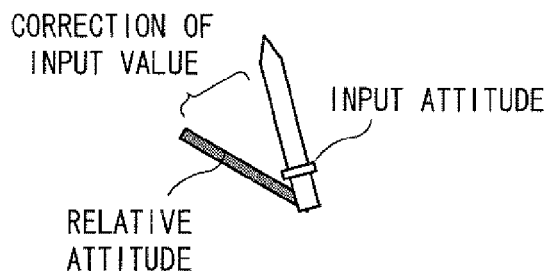

Next, the relative attitude refers to a virtual attitude that is calculated based on the input attitude and the following attitude. More specifically, the relative attitude refers to the input attitude as viewed from the following attitude, i.e., the input attitude when the following attitude is a reference for a coordinate axis. FIGS. 12A to 12D are diagrams showing the basic concept of the relative attitude. It is assumed that there are initially an input attitude and a following attitude as shown in FIG. 12A. Thereafter, as shown in FIG. 12B, these attitudes are rotated together to a location where the following attitude is in the horizontal state while these attitudes are superimposed on each other with their origins coinciding with each other. In other words, the input attitude is converted into a coordinate system in which the following attitude is a reference. Thereafter, as shown in FIG. 12*c*, the converted input attitude is handled as the relative attitude. Basically, the relative attitude is used as the attitude of the sword object in a game process, thereby making it possible to execute a process employing a corrected input value. In other words, as shown in FIG. 12D, the input value is corrected by an angle between the input attitude and the relative attitude. Note that, in this embodiment, the relative attitude is further corrected as described above.

Note that, in this embodiment, the reason why the following attitude and the relative attitude are used is that the input attitude is used in other processes (processes other than the process of moving the sword object) in a game process. In other words, if the input attitude is directly corrected in the process of this embodiment, the other processes are affected, so that the input attitude itself is not directly processed.

Hereinafter, an outline of the correction process of this embodiment will be described using an example in which the input device 8 (the sword object 101 in the virtual game space) is swung up by 90 degrees from a state in which the tip of the input device 8 is directed to the front side, and is then swung down back to the state in which the tip of the input device 8 is directed to the front side.

In this embodiment, a series of process as described below are repeated for each frame. Specifically, a process of calculating the input attitude or the like, a process of determining whether or not the input attitude is in the approaching operation, a process of moving the following attitude nearer to the input attitude when the input attitude is in the approaching operation, a process of calculating the relative attitude, and a process of performing final correction based on the relationship between the relative attitude and the basic attitude, are executed.

Figure 13:
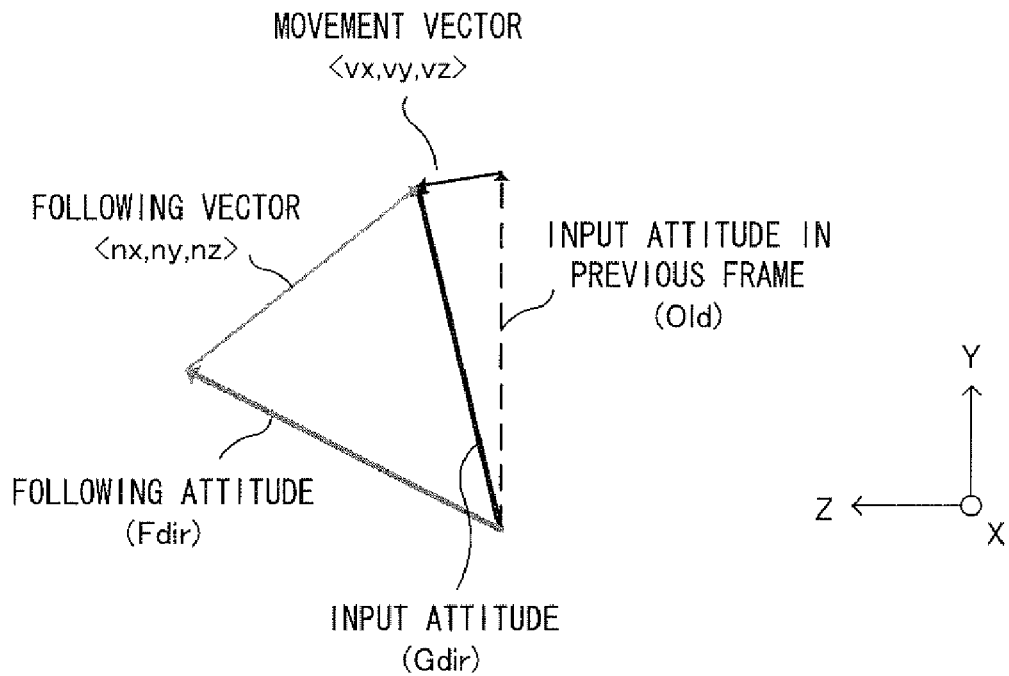
FIG. 13 is a diagram for describing the concept of a process of determining whether or not it is in an approaching operation.
Figure 14:
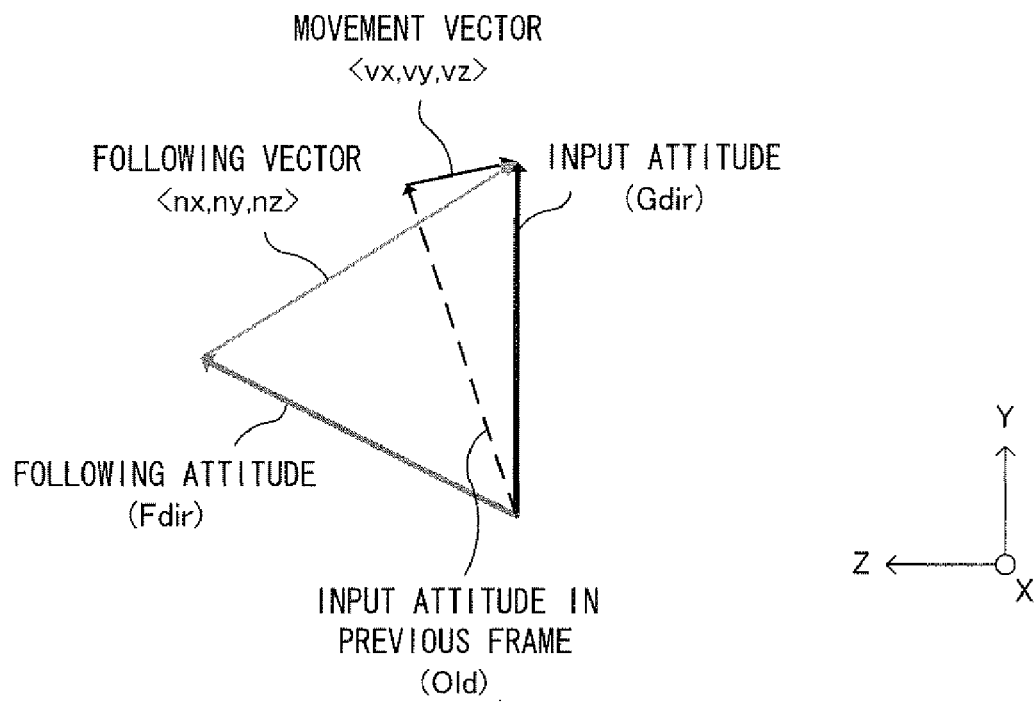
FIG. 14 is a diagram for describing the concept of the process of determining whether or not it is in an approaching operation.

More specifically, initially, an input attitude movement vector is calculated based on the input attitude in a process loop for an immediately previous frame and the input attitude in a process loop for a current frame. Further, a vector indicating a direction in which the following attitude is to be moved is calculated. Thereafter, both the vectors are compared to determine whether or not the input attitude movement vector is a motion vector that approaches the following attitude. FIGS. 13 and 14 are diagrams for describing the concept of the process. FIG. 13 shows an example in which the input attitude is in the approaching operation. FIG. 13 shows an input attitude Gdir calculated in the current frame, an input attitude Old in a process loop for the immediately previous frame, and a following attitude Fdir (a state in the immediately previous process loop). In such a situation, initially, an input attitude movement vector <vz, vy, vz> is calculated based on the input attitudes Gdir and Old. Next, a following vector <nz, ny, nz> that is a vector indicating that the following attitude Fdir moves toward (approaches) the input attitude, is calculated. In the situation of FIG. 13, the inner product of the movement vector and the following vector is calculated as a negative value. In this case, it is determined that the input attitude approaches the following attitude.

On the other hand, FIG. 14 shows the leaving operation of the input attitude. Also in the situation of FIG. 14, the inner product of a movement vector <vz, vy, vz> and a following vector <nz, ny, nz> is similarly calculated as a positive value.

In this case, it is determined that the input attitude moves away (leaves) from the following attitude. Thus, by determining whether the movement directions of the movement vector and the following vector are the same as or opposite to each other, it is determined whether the input attitude is in the approaching operation or in the leaving operation.

As a result of the determination, when the motion of the input attitude in the current frame is the approaching operation, the process of moving the following attitude nearer to the input attitude is executed. On the other hand, when the motion of the input attitude in the current frame is the leaving operation, the following attitude is not moved.

Next, the relative attitude described above (see FIG. 12) is calculated based on the following attitude and the input attitude. In the case of the approaching operation, the following attitude is moved nearer to the input attitude as described above before the relative attitude is calculated. Therefore, the relative attitude is calculated as an attitude slightly moved nearer to following attitude, as compared to the relative attitude in the leaving operation. In other words, only when the input device 8 is swung down, the input attitude is corrected so that the sword object is moved more nearer to the basic attitude.

Thereafter, finally, a final correction based on the basic attitude is performed with respect to the relative attitude (the correction is hereinafter referred to as an offset correction). In the coordinate system of FIG. 9, if the above-described process is repeatedly performed, the relative attitude is eventually converged to a position exactly facing the front side (a state in which the Z-Y angle is zero degrees). On the other hand, since the basic attitude is defined as being directed upward by five degrees as described above, the offset correction is performed so that the relative attitude is finally moved back by five degrees corresponding to the basic attitude (therefore, if the basic attitude is defined as a horizontal state (a state in which the Z-Y angle is zero), the offset correction does not necessarily need to be performed). The attitude after the offset correction is finally used as the attitude of the sword object 101.

Thus, in this embodiment, since correction is performed only in the approaching operation, the input attitude can be corrected without causing the player to feel unnaturalness.

Figure 15:
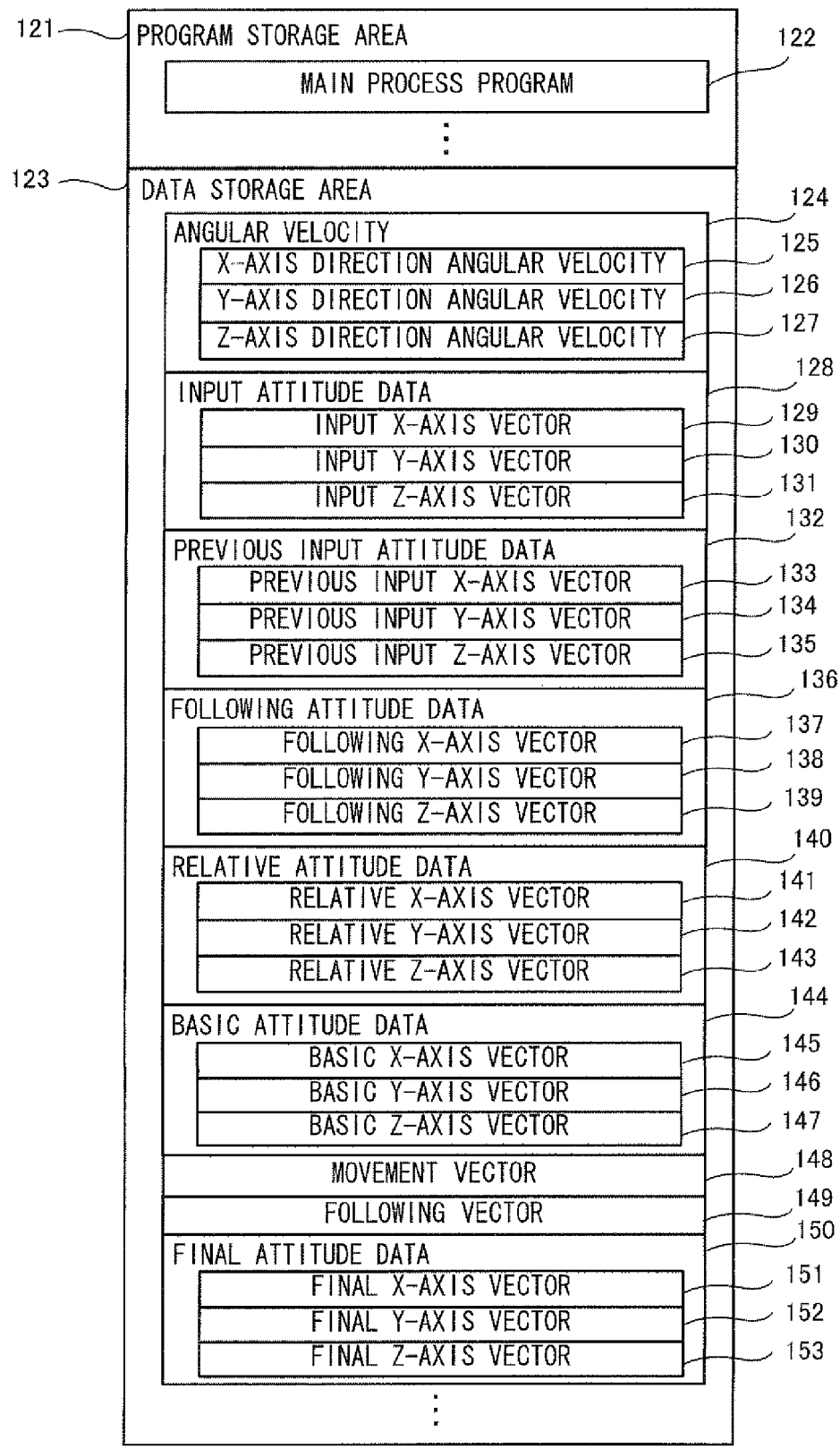
FIG. 15 is a diagram showing a memory map of an external main memory 12.

Next, data that is stored into the external main memory 12 during execution of the correction process of this embodiment will be described. FIG. 15 is a diagram showing a memory map of the external main memory 12 of FIG. 2. In FIG. 15, the external main memory 12 includes a program storing area 121 and a data storing area 123. Data stored in the program storing area 121 and the data storing area 123 is data previously stored in the optical disc 4 that is copied to the external main memory 12.

The program storing area 121 stores a game program that is to be executed by the CPU 10. The game program includes a main process program 122 and the like.

The data storing area 123 stores data, such as angular speed data 124, input attitude data 128, previous input attitude data 132, following attitude data 136, relative attitude data 140, basic attitude data 144, a movement vector 148, a following vector 149, final attitude data 150, and the like.

The angular speed data 124 is angular speed data that is transmitted from the gyro sensor unit 7 via the controller 5. A predetermined number of frames of angular speed data thus obtained (e.g., 30 frames (one frame (1/60 sec) is a game process cycle) are stored. The angular speed data 124 includes an X-axis-direction angular speed 125, a Y-axis-direction angular speed 126, and a Z-axis-direction angular speed 127 that are detected in the three axes, i.e., the X axis, the Y axis, and the Z axis, respectively. Note that the radio controller module 19 of the game apparatus 3 receives the angular speed data 124 included in operation information that is transmitted from the controller 5 at predetermine cycles, e.g., every 5 ms, which is stored into a buffer (not shown) included in the radio controller module 19. Thereafter, the angular speed data 124 is read out and stored into the external main memory 12 for each frame (game process cycle).

The input attitude data 128 is data for indicating an attitude of the input device 8 that is calculated based on the angular speed data 124, and is also information corresponding to Gdir of FIG. 13. The input attitude data 128 includes an input X-axis vector 129, an input Y-axis vector 130, and an input Z-axis vector 131. These vectors are three-dimensional vectors indicating directions of the three axes indicating the attitude of the input device 8 in the space (see FIG. 8). In the following description, for example, the input X-axis vector 129 may be represented by <GdirXx, GdirXy, GdirXz>. Similarly, the input Y-axis vector 130 may be represented by <GdirYx, GdirYy, CdirYz>, and the input Z-axis vector 131 may be represented by <GdirZx, GdirZy, GdirZz>.

The previous input attitude data 132 is data indicating the input attitude in a process loop for an immediately previous frame, and is also information corresponding to Old of FIG. 13. The previous input attitude data 132 includes a previous input X-axis vector 133, a previous input Y-axis vector 134, and a previous input Z-axis vector 135. In the following description, for example, the previous input X-axis vector 133 may be represented by <OldXx, OldXy, OldXz>. Similarly, the previous input Y-axis vector 134 may be represented by <OldYx, OldYy, OldYz>, and the previous input Z-axis vector 135 may be represented by <OldZx, OldZy, OldZz>.

The following attitude data 136 is data for indicating the following attitude described above, and is also information corresponding to Fdir of FIG. 13. The following attitude data 136 includes a following X-axis vector 137, a following Y-axis vector 138, and a following Z-axis vector 139. These vectors are vectors for indicating directions of three axes constituting the following attitude as is similar to the input attitude. Note that, in the following description, the following attitude may be represented by Fdir. Also, the following X-axis vector 137 may be represented by <FdirXx, FdirXy, FdirXz>, the following Y-axis vector 138 is represented by <FdirYx, FdirYy, FdirYz>, and the following Z-axis vector 139 is represented by <FdirZx, FdirZy, FdirZz>.

The relative attitude data 140 is data indicating the relative attitude described above, and includes a relative X-axis vector 141, a relative Y-axis vector 142, and a relative Z-axis vector 143. These vectors are vectors for indicating directions of three axes constituting the relative attitude as is similar to the input attitude. Note that, in the following description, the relative attitude may be represented by Rdir. Also, the relative X-axis vector 141 may be represented by <RdirXx, RdirXy, RdirXz>, the relative Y-axis vector 142 is represented by <RdirYx, RdirYy, RdirYz>, and the relative Z-axis vector 143 is represented by <RdirZx, RdirZy, RdirZz>.

The basic attitude data 144 is data for indicating the basic attitude described above (see FIG. 9), and includes a basic X-axis vector 145, a basic Y-axis vector 146, and a basic Z-axis vector 147. These vectors are vectors for indicating directions of three axes constituting the basic attitude as is similar to the input attitude. Note that, in the following description, the basic attitude may be represented by Bdir. Also, the basic X-axis vector 145 is represented by <BdirXx, BdirXy, BdirXz>, the basic Y-axis vector 146 is represented by <BdirYx, BdirYy, BdirYz>, and the basic Z-axis vector 147 is represented by <BdirZx, BdirZy, BdirZz>.

The movement vector 148 is vector data for indicating how much the input attitude is moved during one frame (how much the controller 5 is moved). The movement vector 148 corresponds to a vector <vx, vy, vz> as shown in FIG. 13.

The following vector 149 is vector data for indicating a direction in which the following attitude is to be moved (a direction in which the input attitude is followed). The following vector 149 corresponds to the vector <nx, ny, nz> of FIG. 13.

The final attitude data 150 is data indicating a final attitude of the sword object 101. In other words, the final attitude data 150 is data indicating an attitude after correction. The final attitude data 150 includes a final X-axis vector 151, a final Y-axis vector 152, and a final Z-axis vector 153. These vectors are vectors for indicating directions of three axes constituting the basic attitude as is similar to the input attitude. Note that, in the following description, the final attitude may be represented by Sdir. ALso, the final. X-axis vector 151 may be represented by <SdirXx, SdirXy, SdirXz>, the final Y-axis vector 152 is represented by <SdirYx, SdirYy, SdirYz>, and the final Z-axis vector 153 may be represented by <SdirZx, SdirZy, SdirZz>.

Figure 16:
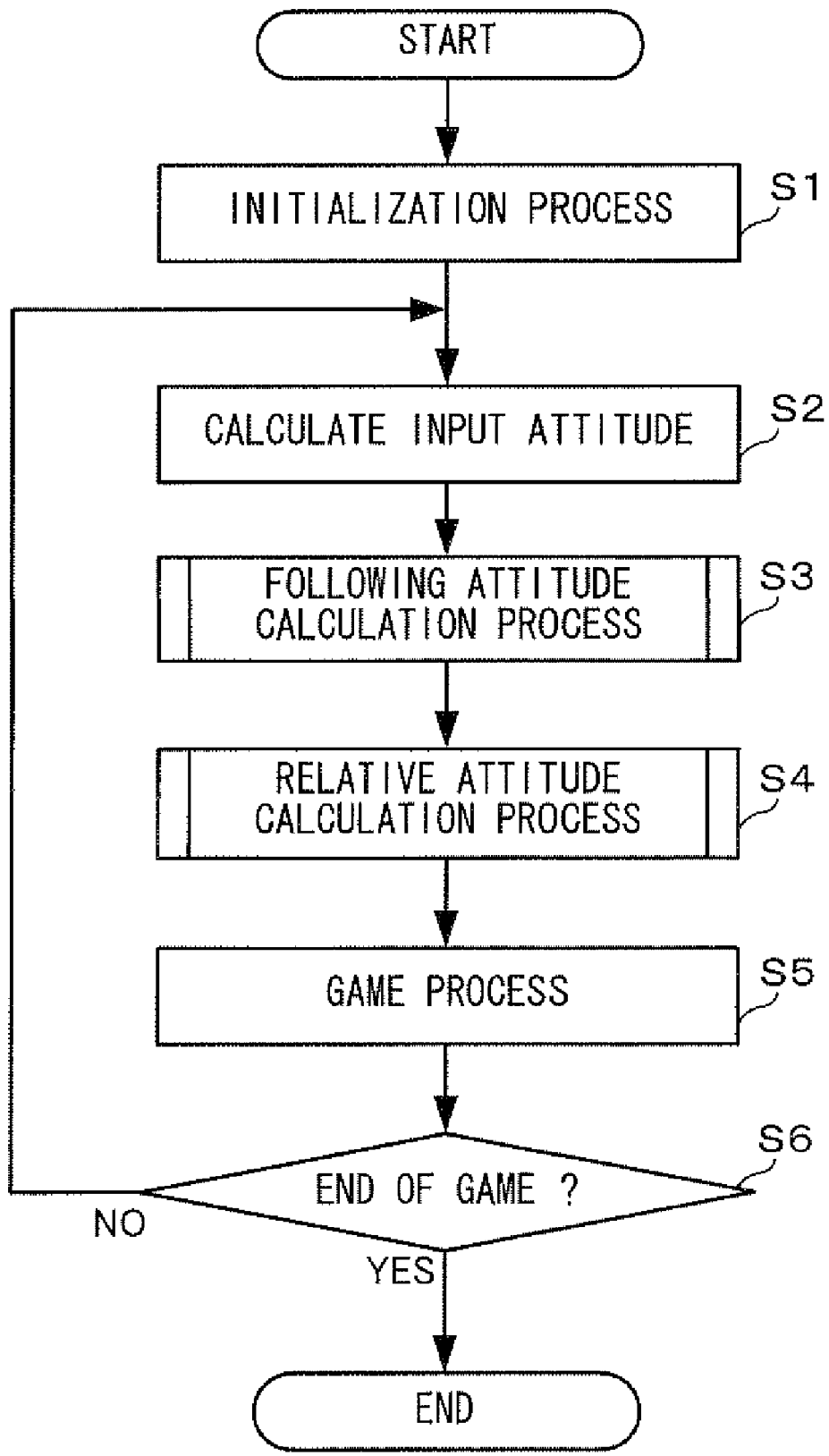
FIG. 16 is a flowchart showing the whole correction process executed by the game apparatus 3.

Next, the correction process executed by the game apparatus 3 will be described with reference to FIGS. 16 to 19. FIG. 16 is a flowchart showing the whole correction process executed by the game apparatus 3.

Initially, in step S1, various pieces of data that are to be used in subsequent processes are initialized. Specifically, the CPU 10 initializes the input attitude data 128 so that the input attitude is directed to the front side. Thereafter, the following attitude data 136 is set to coincide with the input attitude data 128. Specifically, the input attitude of the input device 8 immediately after the start of a game is detected, and the following attitude is caused to coincide with the input attitude. In addition, various variables are initialized. Thereafter, a process loop of steps S2 to S5 is repeated for each frame, thereby causing the game to proceed.

Next, in step S2, the input attitude is calculated. Specifically, the CPU 10 calculates the input X-axis vector 129, the input Y-axis vector 130, and the input Z-axis vector 131 based on the angular speed data 124 obtained from the input device 8 to calculate the input attitude data 128, and stores the input attitude data 128 into the external main memory 12. Note that a basic concept and a basic method for calculating an attitude based on an output of a gyro sensor, and the like are known to those skilled in the art, and therefore, this process will not be described in detail.

Next, in step S3, a following attitude calculation process is executed. FIG. 17 is a flowchart showing a detail of the following attitude calculation process of step S3. In FIG. 17, initially, in step S11, a process for moving the X axis of the three axial components constituting the following attitude (following attitude X-axis movement process) is executed.

Figure 18:
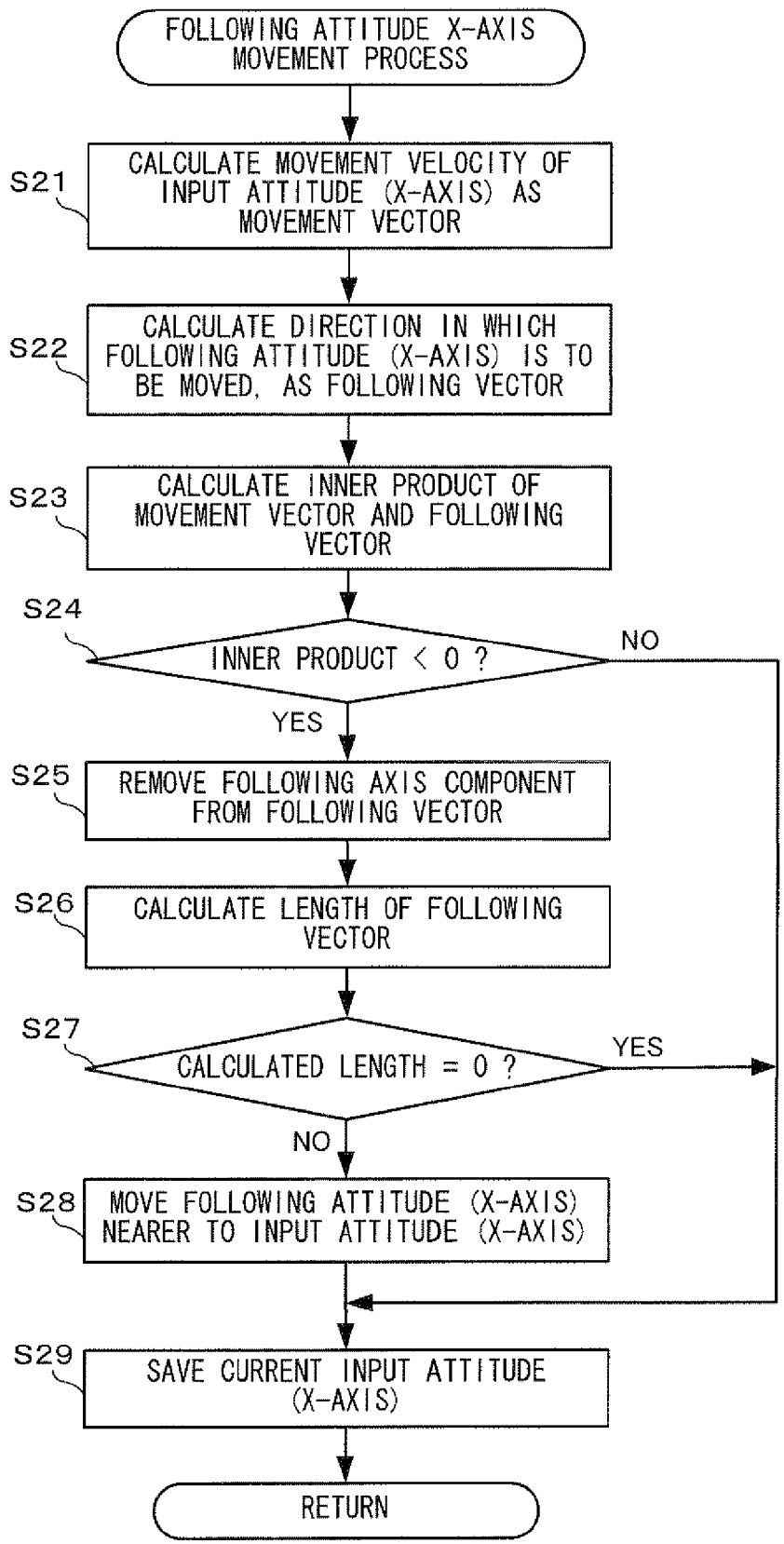
FIG. 18 is a flowchart showing a detail of a following attitude X-axis movement process of step S11 of FIG. 17.

FIG. 18 is a flowchart showing a detail of the following attitude X-axis movement process. Initially, in step S21, a process of calculating a movement vector <vx, vy, vz> with respect to the input X-axis vector 129 is executed. More specifically, the CPU 10 calculates the movement vector <vx, vy, vz> of the input X-axis vector 129 from the immediately previous frame to the current frame using an expression described below. Also, a variable "speed" that is used in a process described below is calculated. The variable "speed" is information for indicating a speed with which the following attitude approaches the input attitude (i.e., the movement speed of the following attitude).

$$vx = GdirXx - OldXx$$

$$vy = GdirXy - OldXy$$

$$vz = GdirXz - Oldxz$$

$$speed = \sqrt{vx^2 + vy^2 + vz^2}$$

In the following step S22, a following vector <nx, ny, nz> of the following X-axis vector 137 is calculated using the following expression.

$$nx = GdirXx - FdirXx$$

$$ny = GdirXy - FdirXy$$

$$nz = GdirXz - FdirXz$$

In the following step S23, the inner product a of the movement vector and the following vector is calculated using the following expression.

$$a = nx \times vx + ny \times vy + nz \times vz$$

Next, in step S24, it is determined whether or not the input X-axis vector 129 approaches the following X-axis vector 137 (an approaching operation or not). Specifically, it is determined whether or not the inner product a calculated in step S23 is smaller than zero. As a result of the determination, if the inner product a is zero or more (NO in step S24), the input X-axis vector 129 is in the leaving operation or in the static state, so that the process goes to step S29 described below.

On the other hand, if the inner product a is smaller than zero (YES in step S24), it is considered that the approaching operation is being performed, so that a process for moving the following X-axis vector 137 nearer to the input X-axis vector 129 is executed. Specifically, initially, as preparation for rotation of the following attitude Fdir (i.e., preparation for movement), a process of extracting a component perpendicular to the following attitude Fdir from the following vector <nx, ny, nz> is executed (step S25). Therefore, a process of removing the parallel component is executed using the following expression.

$$a = FdirXx \times nx + FdirXy \times ny + FdirXz \times nz$$

$$nx = nx - a \times FdirXx$$

$$ny = ny - a \times FdirXy$$

$$nz = nz - a \times FdirXz$$

In the following step S26, a process of calculating the length of a vector is executed using an expression described below. Specifically, a distance by which the following X-axis vector 137 is to be moved is calculated.

$$a = \sqrt{nx^2 + ny^2 + nz^2}$$

In the next step S27, it is determined whether or not the calculated length is zero. In other words, it is determined whether or not the following X-axis vector 137 needs to be moved. If the length is zero (YES in step S27), the following X-axis vector 137 coincides with the input X-axis vector 129, so that the following X-axis vector 137 does not need to be moved. Therefore, the process goes to step S29 described below. On the other hand, if the length is not zero (NO in step S27), a process of moving the following X-axis vector 137 nearer to the input X-axis vector 129 is executed by:

$$b = \text{speed} \times C3 \div a$$

$$FdirXx = FdirXx + b \times nx$$

$$FdirXy = FdirXy + b \times ny$$

$$FdirXz = FdirXz + b \times nz$$

where the variable b indicates a rotation proportion, and the coefficient C3 is a coefficient indicating how much the following X-axis vector 137 is moved nearer to the input X-axis vector 137, and has a value within the range of $0 < C3 \leq 1$. In other words, as a result of this process, Fdir can be moved in units of the rotation proportion b instead of being moved in an amount corresponding to the following vector at a time.

Next, in step S29, a process of storing the current input X-axis vector <GdirXx, GdirXy, GdirXz> as the previous input X-axis vector 133 into the external main memory 12 is executed. Thus, the following attitude X-axis movement process is ended.

Referring back to FIG. 17, in the following step S12, a movement process is executed with respect to the following Y-axis vector. This process is similar to the process that has been described above with reference to FIG. 18, except that the process is executed for the Y axis. Specifically, in the expression described above and the like, the X-, Y- and Z-axis components (e.g., <GdirXx, GdirXy, GdirXz>) of the X-axis vector are replaced with the X-, Y- and Z-axis components <GdirYx, GdirYy, GdirYz> of the Y-axis vector, and thereafter, a process as described above is performed. Therefore, the process will not be described in detail.

Next, in step S13, a movement process is executed with respect to the following Z-axis vector. This process is similar to the process that has been described with reference to FIG. 18, except that the process is performed with respect to the Z axis. Specifically, in the expressions described above and the like, the X-, Y- and Z-axis components of the X-axis vector are replaced with the X-, Y- and Z-axis components <GdirZx, GdirZy, GdirZz> of the Z-axis vector, and thereafter, a process as described above is performed. Therefore, the process will not be described in detail. By the process described above, the following attitude Fdir after movement is calculated.

Next, in step S14, the following attitude Fdir calculated by the process described above is orthogonalized and normalized. Thus, the following attitude calculation process is ended.

Figure 19:
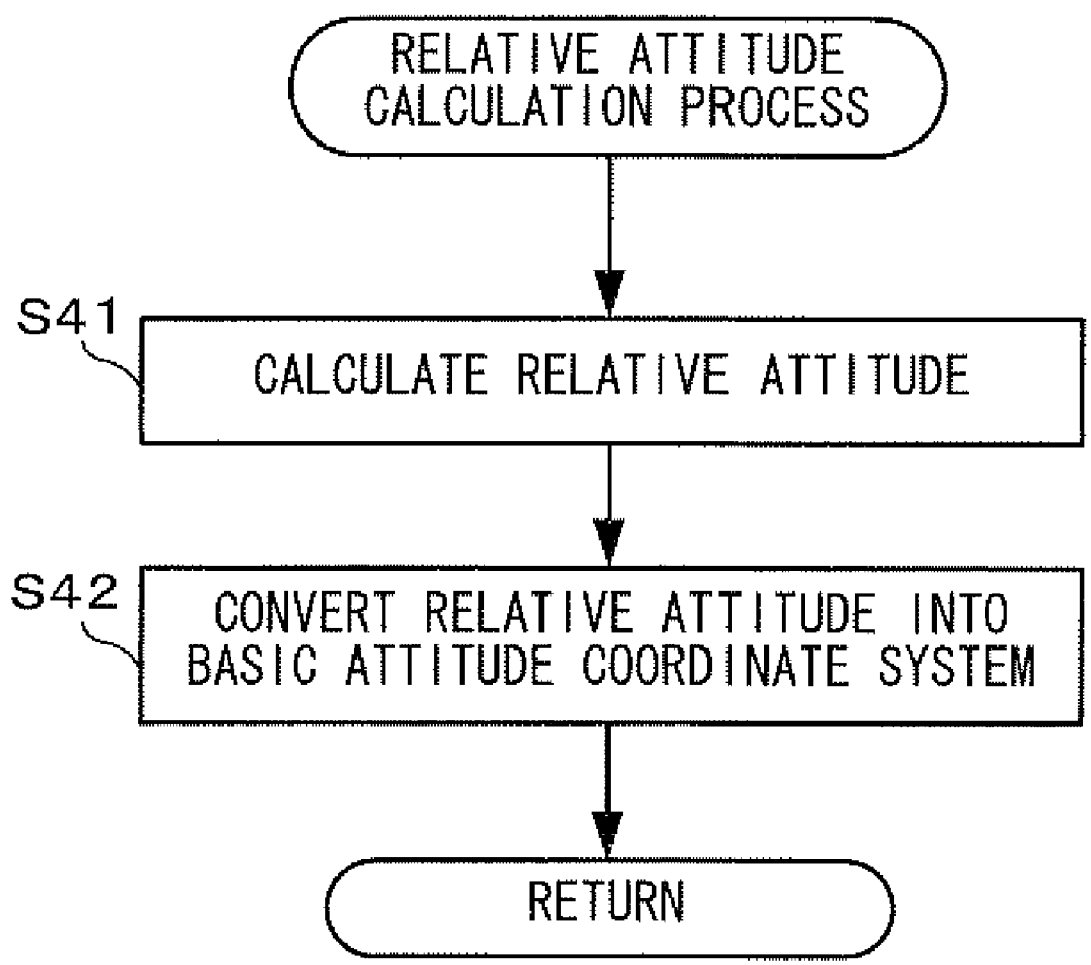
FIG. 19 is a flowchart showing a detail of a relative attitude calculation process of step S4 of FIG. 16.

Referring back to FIG. 16, next, in step S4, the relative attitude calculation process is executed. FIG. 19 is a flowchart showing a detail of the relative attitude calculation process of step S4. In FIG. 19, initially, in step S41, the relative attitude Rdir is calculated based on the input attitude Gdir and the following attitude Fdir. Specifically, the relative attitude Rdir is calculated using the following expression.

$$RdirXx = FdirXx \times GdirXx + FdirXy \times GdirXy + FdirXz \times GdirXz$$

$$RdirXy = FdirYx \times GdirXx + FdirYy \times GdirXy + FdirYz \times GdirXz$$

$$RdirXz = FdirZx \times GdirXx + FdirZy \times GdirXy + FdirZz \times GdirXz$$

$$RdirYx = FdirXx \times GdirYx + FdirXy \times GdirYy + FdirXz \times GdirYz$$

$$RdirYy = FdirYx \times GdirYx + FdirYy \times GdirYy + FdirYz \times GdirYz$$

$$RdirYz = FdirZx \times GdirYx + FdirZy \times GdirYy + FdirZz \times GdirYz$$

$$RdirZx = FdirXx \times GdirZx + FdirXy \times GdirZy + FdirXz \times GdirZz$$

$$RdirZy = FdirYx \times GdirZx + FdirYy \times GdirZy + FdirYz \times GdirZz$$

$$RdirZz = FdirZx \times GdirZx + FdirZy \times GdirZy + FdirZz \times GdirZz$$

Next, in step S42, a process of performing an offset correction as described above (correction for moving the relative attitude nearer to the basic attitude) is executed based on the basic attitude Bdir and the relative attitude Rdir. Specifically, the offset correction is executed using the following expression.

$$SdirXx = BdirXx \times RdirXx + BdirYx \times RdirXy + BdirZx \times RdirXz$$

$$SdirXy = BdirXy \times RdirXx + BdirYy \times RdirXy + BdirZy \times RdirXz$$

$$SdirXz = BdirXz \times RdirXx + BdirYz \times RdirXy + BdirZz \times RdirXz$$

$$SdirYx = BdirXx \times RdirYx + BdirYx \times RdirYy + BdirZx \times RdirYz$$

$$SdirYy = BdirXy \times RdirYx + BdirYy \times RdirYy + BdirZy \times RdirYz$$

$$SdirYz = BdirXz \times RdirYx + BdirYz \times RdirYy + BdirZz \times RdirYz$$

$$SdirZx = BdirXx \times RdirZx + BdirYx \times RdirZy + BdirZx \times RdirZz$$

$$SdirZy = BdirXy \times RdirZx + BdirYy \times RdirZy + BdirZy \times RdirZz$$

$$SdirZz = BdirXz \times RdirZx + BdirYz \times RdirZy + BdirZz \times RdirZz$$

By executing such a process, the final attitude Sdir (the final attitude data 150) indicating an attitude of the sword object 101 is finally obtained. Thus, the relative attitude calculation process is ended.

Referring back to FIG. 16, if the relative attitude calculation is ended, a game process is executed in step S5. Specifically, a process of drawing the sword object 101 that has the attitude indicated by the calculated final attitude Sdir, is executed. Also, other game processes are executed as appropriate. After step S5, it is determined in step S6 whether or not the game is to be ended. If YES, the game process is ended. If NO, the game process is repeated back in step S2. Thus, the description of the correction process of this embodiment is finished.

As described above, in this embodiment, only when the motion of the input attitude is in the approaching operation, the following attitude is moved nearer to the input attitude before a final attitude is calculated. In other words, correction is performed only when the input attitude is in the approaching operation. Thereby, the input attitude can be corrected without causing the player to feel unnaturalness. Also, even when the input attitude is calculated using only a gyro sensor, the input attitude can be calculated with high accuracy. Also, since the calculation process is executed using only a gyro sensor, it is advantageous in terms of the cost effectiveness of the input device.

Note that, in the embodiment described above, taking into consideration an influence on game processes other than the correction process, the following attitude and the relative attitude are used so that the input attitude (the input attitude data 128) is not directly changed. The present invention is not limited to this. As long as the other game processes are not affected, only a relationship between the basic attitude and the input attitude may be used without using the following attitude or the relative attitude. Specifically, it is determined whether or not the input attitude is in the approaching operation to the basic attitude. As a result of the determination, only when the input attitude is in the approaching operation, the input attitude data 128 is directly corrected so that the input attitude is moved more nearer to the basic attitude. Thereafter, the attitude of the sword object 101 may be changed based on the input attitude data 128 after correction.

It has also been described in the embodiment above that the input attitude is calculated by calculating three-dimensional vectors indicating directions of three axes (the X axis, the Y axis and the Z axis) indicating the direction of the controller 5. The present invention is not limited to this. Any processing method may be used as long as the input attitude of the controller 5 can be calculated. Thereafter, it may be determined whether an operation of the input attitude calculated by any processing method is in the approaching operation or in the leaving operation with respect to the basic attitude or the following attitude that are virtual attitudes. The input attitude may be corrected only if the input attitude is in the approaching operation.

Second Embodiment

Next, a second example embodiment of the present invention will be described with reference to FIGS. 20 to 24. In the second embodiment, in addition to a correction process as performed in the first embodiment described above, the way of swinging a controller 8 is determined, and based on this, a process of executing correction with respect to a direction in which the controller 8 faces, is performed. More specifically, a series of operations from the start of swinging the controller 8 by the player to the end of the swinging (hereinafter referred to as a one-swing operation) are detected. If the swinging way is "vertical swing (swinging from up to down or swinging from down to up)", a process of correcting the direction of the controller 8 to a front-side direction in a game is executed.

For example, as shown in FIG. 20, it is assumed that when the player is swinging the controller while facing the monitor 2, the player faces a front side. As shown in FIG. 21, when the player is swinging the controller 8 while facing to the right at an angle of 90 degrees with respect to the monitor 2, the player faces the television 2 in a game process at the timing of performance of a vertical swing operation, i.e., correction is performed so that the player is handled as if the player were swinging the controller 8 while facing the front side. More specifically, when a vertical swing operation is detected in the state of FIG. 21, an angular deviation between a direction in which the player faces (hereinafter referred to as a forward direction) and a front-side direction (the state of FIG. 20) is calculated. Thereafter, a process of rotating the sword object 101 about the Y axis toward the front-side direction by the angular deviation and then drawing the sword object 101, is executed.

For example, assuming that an enemy object is displayed on exactly a front side as a game screen, the tip of the sword object 101 may be directed obliquely forward due to accumulation of calculation errors or the like, without the player being aware of it, while the player is swinging the controller 8. Alternatively, the body of the player itself (the tip of the controller 8) may be directed somehow obliquely (the state of FIG. 21 is an extreme example). In this case, the sword object 101 may not perfectly strike an enemy object on the exact front side. Even in such a state, the direction of the sword object 101 is corrected into the front-side direction by executing a process as described below, so that the sword object 101 is caused to strike an enemy object or the like displayed on the exact front side.

Here, the reason why correction is performed when a vertical swing operation is detected is that, in a horizontal swing operation, it is difficult to accurately calculate the front-side direction, and as a result, it is difficult to accurately calculate an angular deviation from the front side.

Note that the game apparatus 3 of this embodiment is similar to that of the first embodiment, and therefore, like parts are indicated by the same reference numerals and will not be described in detail.

Next, an outline of a process according to the second embodiment will be described. In the second embodiment, data (the final attitude data 150) indicating the attitude of the sword object 101 after correction as described in the first embodiment is performed, is accumulated in a buffer for each frame when the controller 8 is being swung (one-swing operation). Thereafter, when the end of the one-swing operation is detected, the accumulated data is analyzed to calculate a confidence coefficient indicating how much the one-swing operation is close to the "vertical swing operation". The confidence coefficient takes a value of "1" when the controller 8 is exactly vertically swung and a value of "0" when the controller 8 is exactly horizontally swung. Moreover, a forward vector indicating the forward direction is calculated, and then, a difference in angle between the forward vector and a front-side vector indicating the front-side direction is calculated. Thereafter, based on the angle, the attitude of the sword object 101 is rotated about the Y axis to correct the attitude of the sword object. Note that, in this case, the correction angle is adjusted, depending on the confidence coefficient. Specifically, when the confidence coefficient is small, the correction width is adjusted to be small. Also, in this embodiment, correction is not performed by the correction angle at a time, and is gradually performed over several frames. For example, when the angular deviation is 40 degrees, correction is performed by 10 degrees per frame, i.e., correction is performed over four frames. This is in order that the player is prevented from feeling unnaturalness that would be otherwise caused when correction is performed at a time (in other words, the player is prevented from being aware of correction).

Figure 22:
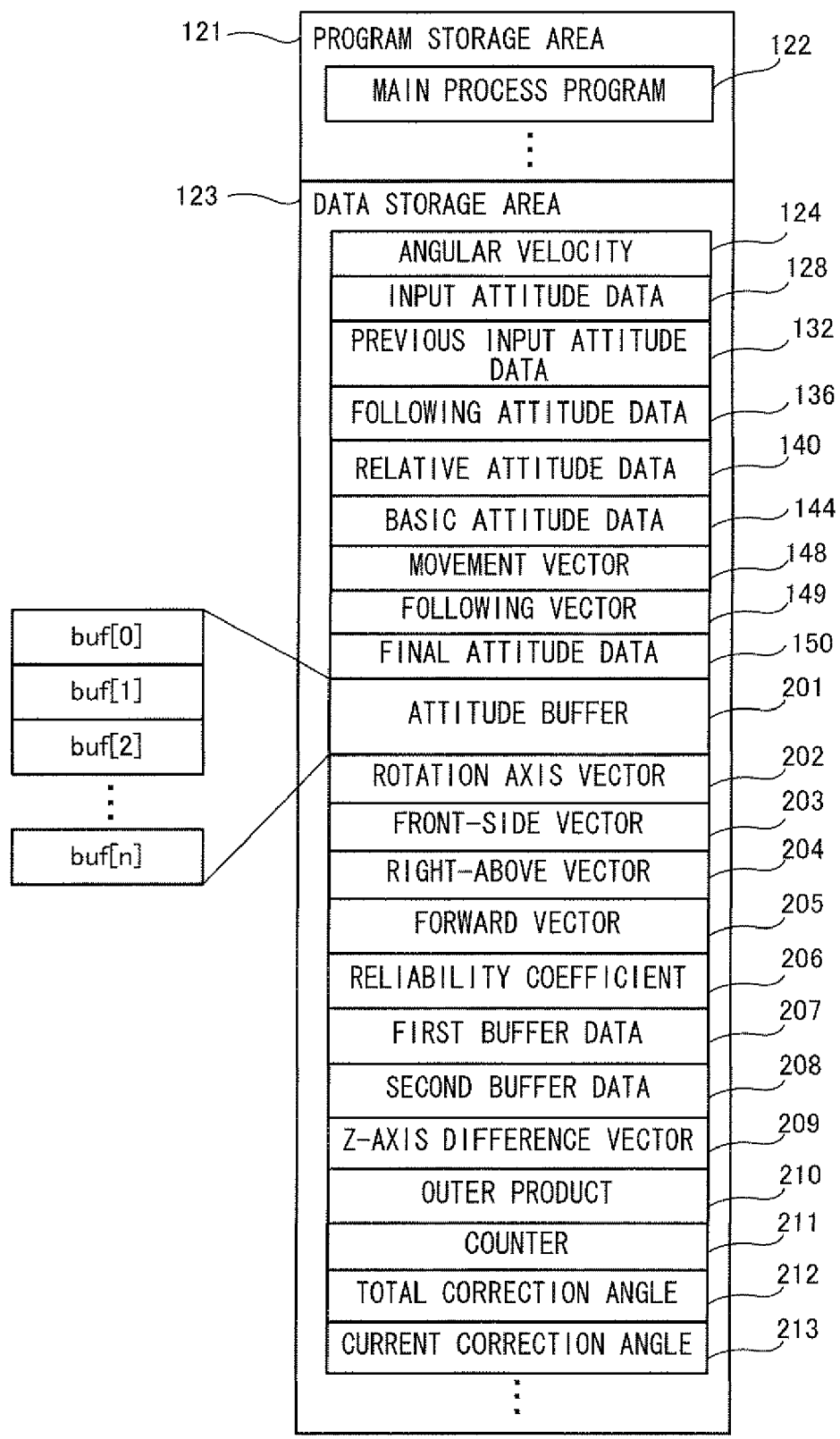
FIG. 22 is a diagram showing a memory map of an external main memory 12 according to the second embodiment.

Next, data used in the second embodiment will be described. FIG. 22 is a diagram showing a memory map of an external main memory 12 according to the second embodiment. In FIG. 22, the external main memory 12 of the second embodiment stores, in addition to the various pieces of data described in the first embodiment, an attitude buffer 201, a rotation-axis vector 202, a front-side vector 203, a right-above vector 204, a forward vector 205, a confidence coefficient 206, first buffer data 207, second buffer data 208, a Z-axis difference vector 209, outer product data 210, a counter 211, a total correction angle 212, and a current correction angle 213.

In the attitude buffer 201, data indicating the attitude of the sword object for each frame in the one-swing operation (the final attitude data 150 calculated for each frame in the first embodiment) is stored in time series. In the following description, attitude data of each frame stored in the attitude buffer 201 is represented by buf[n] ([n] is an integer of zero or more, which serves as a subscript of an array, where a smaller number indicates more previous data).

The rotation-axis vector 202 is a vector indicating a rotation axis in the one-swing operation. For example, when the controller 8 is swung from up to down exactly vertically in a coordinate system as shown in FIG. 8, the tip of the controller 8 is rotated about the X axis, so that a vector in the X-axis direction corresponds to a rotation-axis vector.

The front-side vector 203 is a unit vector that defines a state in which the controller 8 is directed to the front side, and is assumed as <0, 0, 1> in this embodiment.

The right-above vector 204 is a unit vector for indicating a right-above direction, and is assumed as the Y-axis vector <0, 1, 0> in the state of FIG. 8 in this embodiment.

The forward vector is a vector for indicating a direction in which the tip of the controller 8 faces (a direction in which the player faces). For example, the forward vector is represented by <0, 0, 1> in the sate of FIG. 20, and <−1, 0, 0> in a state in which the place faces to the right as shown in FIG. 21.

The confidence coefficient 206 is information indicating how much the one-swing operation is close to the "vertical swing operation" as described above. The confidence coefficient takes a value within the range of 1 to 0. In a process described below, the confidence coefficient takes a value of "1" when the controller 8 is swung exactly vertically (i.e., the vertical swing operation), and a value of "0" when the controller 8 is swung exactly horizontally.

The first buffer data 207, the second buffer data 208, the Z-axis difference vector 209, and the outer product data 210 are variables that are used in a process described above so as to analyze attitude data stored in the attitude buffer 201. The counter 211 is a variable that is also used as a counter in the process described below.

The total correction angle 212 and the current correction angle 213 indicate angles to be corrected as described above. As described above, in this embodiment, correction is not performed by the correction angle at a time, and is gradually performed over several frames. The current correction angle 213 indicates an angle by which correction is performed in a process corresponding to one frame, of an angle indicated by the total correction angle 212.

Figure 23:
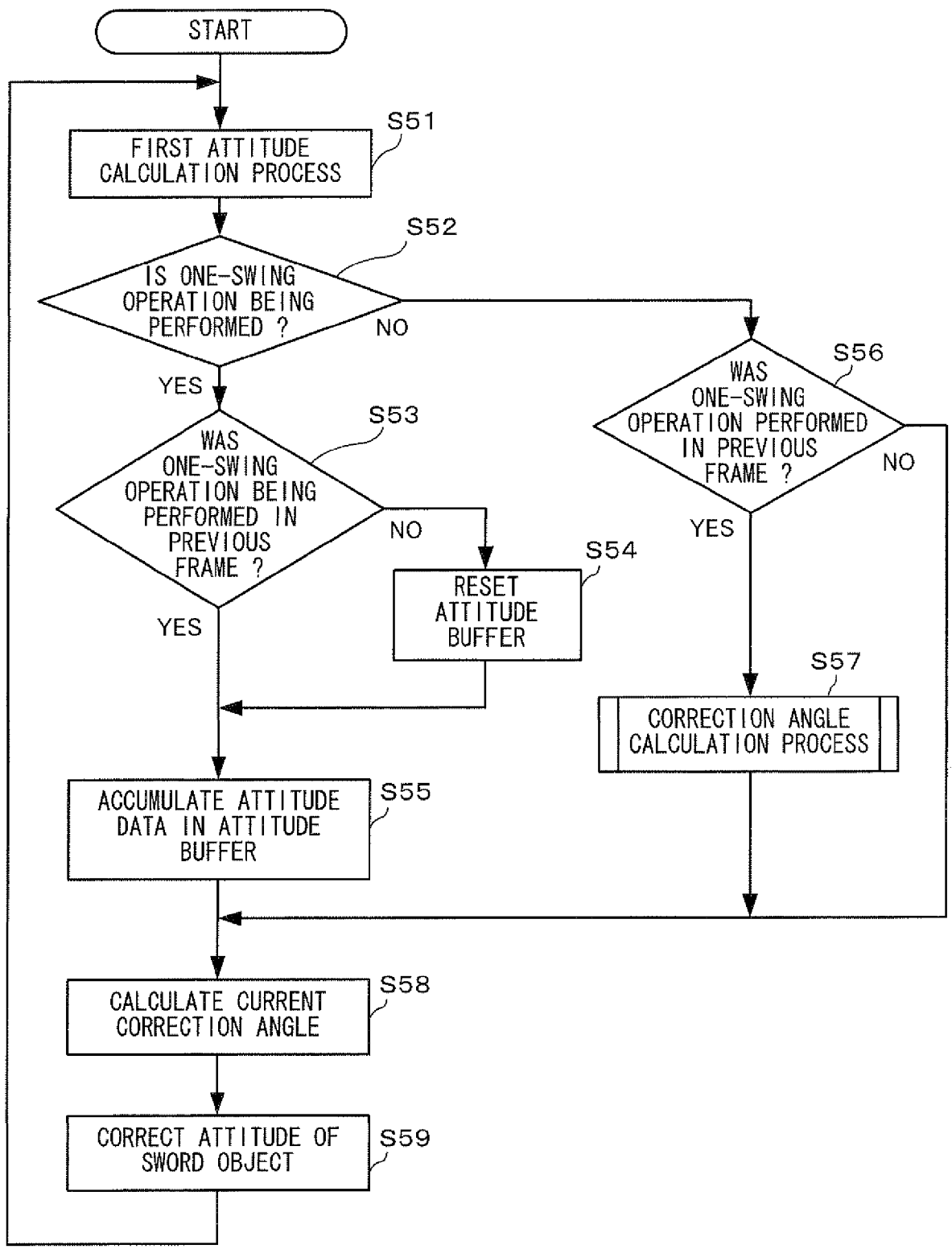
FIG. 23 is a flowchart showing the whole process of the second embodiment.

Hereinafter, a detail of the process of the second embodiment will be described. FIG. 23 is a flowchart showing the whole process of the second embodiment. In FIG. 23, initially, in step S51, a first attitude calculation process is executed. In this process, a process as described in the first embodiment is executed. Specifically, the input attitude is calculated based on data from the gyro sensor, and the attitude (the final attitude data 150) of the sword object 101 after correction as described above is performed using the following attitude, the relative attitude and the basic attitude, is calculated by this process.

Next, in step S52, it is determined whether or not the controller 8 is being swung. Specifically, it is determined whether the controller 8 is in the one-swing operation or is not being swung (the player is not moving a hand holding the controller 8). This determination may be, for example, achieved by determining whether or not the length of the X-Y component of the angular speed data 124 exceeds a predetermined threshold.

As a result of the determination in step S52, when it is determined that the controller 8 is in the one-swing operation (YES in step S52), it is then determined in step S53 whether or not the controller 8 is also in the one-swing operation in a process loop for the immediately previous frame. In other words, it is determined whether it is immediately after the start of the one-swing operation or it is in a continued state of the one-swing operation. In this case, the result of the determination in step S52 may be stored into the external main memory 12 for each frame, and by referencing the determination result, the continuation of the one-swing operation may be determined.

As a result of the determination, if it is immediately after the start of the one-swing operation (NO in step S53), the attitude buffer 201 is cleared in step S54. On the other hand, if the one-swing operation was being performed in the process loop for the immediately previous frame (YES step S53), the process goes to step S55 without performing step S54.

Next, in step S55, the final attitude data 150 calculated in step S51 is stored into the attitude buffer 201. Thereafter, the process goes to step S58.

On the other hand, as a result of the determination in step S52, when the controller 8 is not in the one-swing operation (NO in step S52), it is determined in step S56 whether or not the one-swing operation was being performed in the process loop for the immediately previous frame. In other words, it is determined whether the one-swing operation has been ended or the one-swing operation was not being performed. As a result of the determination, if it is determined that the one-swing operation was not being performed (NO in step S56), the process goes to step S58 described below. On the other hand, if it is determined that the one-swing operation was being performed in the process loop for the immediately previous frame (the one-swing operation has been ended) (YES in step S56), a correction angle calculation process is executed in the following step S57.

Figure 24:
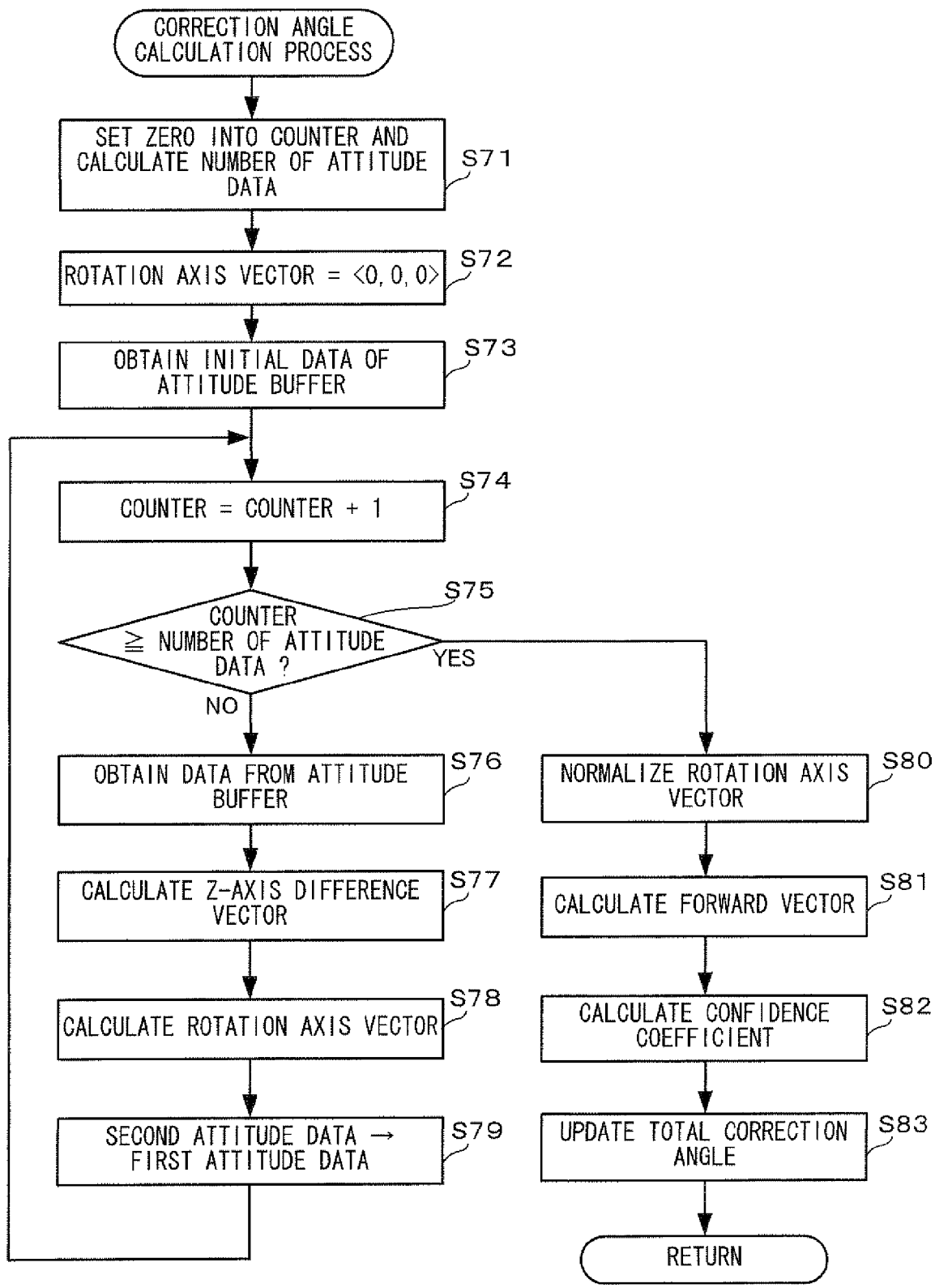
FIG. 24 is a flowchart showing a detail of a correction angle calculation process of step S57 of FIG. 23.

FIG. 24 is a flowchart showing a detail of the correction angle calculation process of step S57. In this process, the attitude data accumulated in the attitude buffer 201 is analyzed to execute a process of calculating an angle for correcting the attitude (a pointing direction) of the sword object 101. In FIG. 24, initially, in step S71, "0" is set into the counter 211. Also, in this case, the number of pieces of attitude data stored in the attitude buffer 201 (hereinafter referred to as the number of attitude data) is calculated.

Next, in step S72, the rotation-axis vector 202 is initialized to <0, 0, 0>.

Next, in step S73, buf[0] that is the first data in the attitude buffer 201 is set as the first buffer data 207. In the following step S74, the counter 211 is incremented by one.

In the following step S75, it is determined whether or not the counter 211 is larger than or equal to the number of attitude data calculated in step S71. In other words, it is determined whether or not a process described below has been performed with respect to all data in the attitude buffer 201. As a result of the determination, if the counter 211 is smaller than the number of attitude data (NO in step S75), then attitude data indicated by the counter 211 (i.e., buf[counter 211]) is obtained from the attitude buffer 201, and is set as the second buffer data 208 in step S76. For example, when the process is first executed, attitude data indicated as buf[1] is set as the second buffer data 208.

Next, in step S77, the Z-axis difference vector 209 is calculated using the following expression.

The Z-axis difference vector=the Z-axis vector of the second buffer data−the Z-axis vector of the first buffer data Next, in step S78, the rotation-axis vector 202 is calculated using the following expression.

The outer product data=the Z-axis difference vector×
the Z-axis vector of the second buffer data The rotation-axis vector=the rotation-axis vector+the
outer product data Thus, by calculating the outer product of the Z-axis difference vector and the Z-axis vector of the second buffer data, a rotation axis for the two frames of attitude is calculated. For example, when the process is first executed, a rotation axis for a change in attitude data represented by buf[0] and buf[1] is calculated. Thereafter, the calculated rotation axis is added to the rotation-axis vector 202.

Next, in step S79, for a process in the next process loop, the second buffer data 208 is set as the first buffer data 207. Thereafter, the process returns to step S74, and the process loop is repeated.

On the other hand, as a result of the determination in step S75, when it is determined that the counter 211 is larger than or equal to the number of attitude data in step S71 (YES in step S75), calculation of a rotation axis and addition to the rotation-axis vector 202 as described above are performed with respect to all data in the attitude buffer 201. In this case, in step S80, the rotation-axis vector 202 is normalized.

Next, in step S81, the forward vector 205 is calculated. This calculation is achieved by calculating the outer product of the rotation-axis vector 202 and the right-above vector 204. For example, in a coordinate system as shown in FIG. 8, when an exact vertical swing operation is performed, a change in attitude of the controller 8 is a rotation about the X axis. Specifically, the rotation-axis vector is a vector having the X-axis direction. Therefore, if the outer product of the rotation-axis vector and the Y-axis vector indicating the right-above direction is calculated, a vector having the Z-axis direction is calculated as the forward vector 205.

Next, in step S82, the confidence coefficient 206 is calculated. This calculation is achieved by multiplying the length of the forward vector 205 by a predetermined constant α.

The confidence coefficient=the length of the forward
vector×the constant α

As described above, the confidence coefficient 206 is a coefficient indicating how close the way of swinging the controller 8 is to the vertical swing operation, so to speak, a "vertical swing degree". The closer the length of the forward vector 205 is to "1", the larger the vertical swing degree. For example, if the controller 8 is swung down exactly vertically, the rotation axis is a vector having the X-axis direction and the length of the forward vector 205 is one as described above. If the controller 8 is swung exactly horizontally, the rotation axis is a vector having the Y-axis direction, the length of the forward vector 205 is "0".

Next, in step S83, the correction angle is updated. Specifically, the following process is executed. Initially, the CPU 10 calculates the arc cosine of the forward vector 205, thereby calculating a difference in angle between the front-side vector 203 and the forward vector 205 (i.e., an angular deviation from the front side). Next, the CPU 10 determines whether or not the X-axis component of the forward vector 205 is larger than "0". If the X-axis component of the forward vector 205 is larger than "0", i.e., the tip of the controller 8 is directed to the left (closer to the left), the sign of the calculated angular deviation is inversed (positive/negative). In other words, it is determined whether the controller 8 is deviated from the front side to the right or to the left. In either case, a direction in which correction is performed is adjusted to be the front-side direction (e.g., as a result of the calculation of the arc cosine, when the angle difference is calculated as 45 degrees, then if the controller 8 is directed to the left, correction is performed by −45 degrees, or if the controller 8 is directed to the right, correction is performed by +45 degrees). Further, the CPU 10, when the confidence coefficient 206 is small, performs an adjustment so that the correction width is reduced using the following expression, to calculate the total correction angle 212.

The total correction angle=the calculated correction
angle×the confidence coefficient Thus, the correction angle calculation process is ended.

Referring back to FIG. 23, in the next step S58, the current correction angle 213 is calculated. As described above, in this embodiment, correction corresponding to the total correction angle 212 is not performed at a time, and is gradually performed over several frames. Therefore, it is calculated how much correction is performed in a process for the current frame. Specifically, correction is performed the number of times corresponding to the number of divisions of the total correction angle 212 using the following expression.

The current correction angle=the total correction
angle×0.03

The total correction angle=the total correction angle−
the current correction angle Next, in step S59, the attitude of the sword object 101 is rotated about the Y axis in an amount indicated by the current correction angle 213. Thereafter, the sword object 101 having the rotated attitude is drawn as a game screen. Thus, the process of the second embodiment is ended.

Thus, in the second embodiment, when a vertical swing operation is performed, correction is performed so that the controller 8 is directed to the front side. Thereby, the input attitude can be corrected and the corrected attitude can be reflected on a game process, without causing the player to feel unnaturalness.

Although it has been described as an example in this second embodiment that an attitude after execution of a correction process as described in the first embodiment is further corrected, the input attitude may be subjected only to direction correction as described above without performing the correction process of the first embodiment.

Although it has also been described as an example in each embodiment above that the attitude of the controller 5 is calculated based on an output of a gyro sensor, example embodiments of the present invention can be applied to a case where the attitude of the controller 5 is, for example, calculated based on an output of an acceleration sensor. The present invention can also be applied to a case where the attitude of the controller 5 is calculated using outputs of both an acceleration sensor and a gyro sensor.

While the invention has been described in detail, the foregoing description is in all aspects illustrative and not restrictive. It is understood that numerous other modifications and variations can be devised without departing from the scope of the invention.

What is claimed is:

1. A non-transitory computer readable recording medium recording an information processing program that is executed by a computer of an information processing apparatus for performing a predetermined information process based on a motion detection signal output from an input device including a motion detection sensor for detecting its own motion, wherein the process comprises:

repeatedly calculating a first attitude indicating an attitude of the input device based on the motion detection signal;

calculating a motion of the first attitude based on the repeatedly calculated first attitude;

determining whether or not the first attitude is performing a motion of approaching a predetermined attitude, which corresponds to a base position of the input device, based on the calculated motion of the first attitude;

setting, as an input attitude, an attitude obtained by correcting the first attitude so that the first attitude coincides with or approaches the predetermined attitude direction if the first attitude is performing the motion of approaching the predetermined attitude, or setting the first attitude as an input attitude if the first attitude is not performing the motion of approaching the predetermined attitude; and performing a predetermined information process based on the input attitude.

2. The non-transitory computer readable recording medium recording the information processing program according to claim 1, wherein said calculating the motion includes calculating a movement vector of the first attitude based on a change in the repeatedly calculated first attitude, and said determining includes determining whether or not the motion of the first attitude is the motion of approaching the predetermined attitude, based on the movement vector.

3. The non-transitory computer readable recording medium recording the information processing program according to claim 2, wherein the process further includes calculating a second attitude that is a predetermined attitude related to the first attitude, and the second attitude is used as the predetermined attitude.

4. The non-transitory computer readable recording medium recording the information processing program according to claim 3, wherein said calculating the second attitude includes calculating, as the second attitude, a following attitude that is an attitude that gradually approaches the first attitude.

5. The non-transitory computer readable recording medium recording the information processing program according to claim 4, wherein said calculating the motion includes:

calculating a following vector that is a vector along which the following attitude is moved toward the first attitude, and said determining includes determining whether or not the first attitude is performing the motion of approaching the second attitude, based on an angle between the movement vector and the following vector.

6. The non-transitory computer readable recording medium recording the information processing program according to claim 5, wherein said determining includes:

calculating an inner product of the movement vector and the following vector, and said determining includes determining whether or not the first attitude is performing the motion of approaching the second attitude, based on the calculated inner product.

7. The non-transitory computer readable recording medium recording the information processing program according to claim 1, wherein said setting the input attitude includes:

calculating a second attitude that is a predetermined attitude related to the first attitude, wherein the second attitude is used as the predetermined attitude;

calculating a third attitude indicating the first attitude in a coordinate system where the predetermined attitude is a reference, and if the first attitude is performing the motion of approaching the predetermined attitude, said setting the input attitude includes moving the predetermined attitude nearer to the first attitude before calculating and setting the third attitude as the input attitude, and if the first attitude is not performing the motion of approaching the predetermined attitude, said setting includes calculating and setting the third attitude as the input attitude without moving the predetermined attitude.

8. The non-transitory computer readable recording medium recording the information processing program according to claim 7, wherein said setting the input attitude includes:

calculating a fourth attitude indicating the third attitude in a coordinate system where a predetermined basic attitude is a reference, and said setting the input attitude includes setting the fourth attitude as the input attitude.

9. The non-transitory computer readable recording medium recording the information processing program according to claim 1, wherein the processes further comprises calculating a second attitude that is a predetermined attitude related to the first attitude, and the second attitude is used as the predetermined attitude.

10. The non-transitory computer readable recording medium recording the information processing program according to claim 9, wherein said calculating the second attitude includes calculating, as the second attitude, a following attitude that is an attitude that gradually approaches the first attitude.

11. A non-transitory computer readable recording medium recording an information processing program that is executed by a computer of an information processing apparatus for performing a predetermined information process based on a motion detection signal output from an input device including a motion detection sensor for detecting its own motion, wherein the process comprises:

repeatedly calculating an input attitude indicating an attitude of the input device based on the motion detection signal;

calculating a rotation direction of the input attitude about a predetermined axis based on the repeatedly calculated input attitude;

correcting the input attitude in a next rotational operation of the input device, calculated after calculation the rotation direction of the input attitude in a rotational operation of the input device, based on a difference between the rotation direction of the input attitude and a predetermined reference rotation direction; and performing a predetermined information process based on the corrected input attitude.

12. The non-transitory computer readable recording medium recording the information processing program according to claim 11, wherein said calculating the rotation direction includes:

calculating a rotation axis about which the input attitude is rotated, from the repeatedly calculated input attitude, and said correcting the input attitude includes correcting the input attitude so that the calculated rotation axis coincides with or approaches the rotation axis of the predetermined reference rotation direction.

13. The non-transitory computer readable recording medium recording the information processing program according to claim 12, wherein
said calculating the rotation axis includes:
calculating input rotation axes orthogonal to successive, repeatedly calculated input attitudes in time series; and
calculating an average rotation axis that is an average of the calculated input rotation axes, and
the calculated average rotation axis is a rotation axis for rotation of the input attitude.

14. The non-transitory computer readable recording medium recording the information processing program according to claim 12, wherein the process further comprises:
calculating a forward vector indicating a forward direction of the input device, where the forward vector is indicated as an outer product of a vector indicating the calculated rotation axis and a right-above vector that is a vector indicating a right-above direction, and
said correcting the input attitude includes calculating the input attitude so that the calculated forward vector coincides with or approaches the predetermined reference rotation direction.

15. The non-transitory computer readable recording medium recording the information processing program according to claim 11, wherein the process further comprises
calculating an approximation between a rotation direction of the input attitude and a direction that rotates about an axis perpendicular to a plumb line, and
said calculating the input attitude includes performing correction, depending on the calculated approximation.

16. An information processing apparatus for performing a predetermined information process based on a motion detection signal output from an input device including a motion detection sensor for detecting its own motion, comprising:
a first attitude calculation programmed logic circuitry for repeatedly calculating a first attitude indicating an attitude of the input device based on the motion detection signal;
a motion calculation programmed logic circuitry for calculating a motion of the first attitude based on the first attitude repeatedly calculated by the first attitude calculation programmed logic circuitry;
an approaching operation determination programmed logic circuitry for determining whether or not the first attitude is performing a motion of approaching a predetermined attitude, which corresponds to a base position of the input device, based on the motion of the first attitude calculated by the motion calculation programmed logic circuitry;
an input attitude setting programmed logic circuitry for setting, as an input attitude, an attitude obtained by correcting the first attitude so that the first attitude coincides with or approaches the predetermined attitude direction if the first attitude is performing the motion of approaching the predetermined attitude, or setting the first attitude as an input attitude if the first attitude is not performing the motion of approaching the predetermined attitude; and
a process execution programmed logic circuitry for performing a predetermined information process based on the input attitude.

17. An information processing apparatus for performing a predetermined information process based on a motion detection signal output from an input device including a motion detection sensor for detecting its own motion, comprising:
an input attitude calculation programmed logic circuitry for repeatedly calculating an input attitude indicating an attitude of the input device based on the motion detection signal;
a rotation direction calculation programmed logic circuitry for calculating a rotation direction of the input attitude about a predetermined axis based on the input attitude repeatedly calculated by the input attitude calculation programmed logic circuity;
an input attitude correction programmed logic circuitry for correcting the input attitude in a next rotational operation of the input device, calculated after calculating the rotation direction of the input attitude in a rotational operation of the input device, based on a difference between the rotation direction of the input attitude and a predetermined reference rotation direction; and
a process execution programmed logic circuitry for performing a predetermined information process based on the input attitude corrected by the input attitude correction programmed logic circuitry.

18. A method performing a predetermined information process with an information processing apparatus based on a motion detection signal output from an input device including a motion detection sensor for detecting its own motion, the method comprising:
repeatedly calculating, using the information processing apparatus, a first attitude indicating an attitude of the input device based on the motion detection signal;
calculating a motion of the first attitude based on the repeatedly calculated first attitude;
determining whether or not the first attitude is performing a motion of approaching a predetermined attitude, which corresponds to a base position of the input device, based on the calculated motion of the first attitude;
setting, as an input attitude, an attitude obtained by correcting the first attitude so that the first attitude coincides with or approaches the predetermined attitude direction if the first attitude is performing the motion of approaching the predetermined attitude, or setting the first attitude as an input attitude if the first attitude is not performing the motion of approaching the predetermined attitude; and
performing a predetermined information process based on the input attitude.

19. A system configured to perform a predetermined information process based on a motion detection signal output from an input device including a motion detection sensor for detecting its own motion, the system comprising a processor configured to:
repeatedly calculate a first attitude indicating an attitude of the input device based on the motion detection signal;
calculate a motion of the first attitude based on the repeatedly calculated first attitude;
determine whether or not the first attitude is performing a motion of approaching a predetermined attitude, which corresponds to a base position of the input device, based on the calculated motion of the first attitude;
set, as an input attitude, an attitude obtained by correcting the first attitude so that the first attitude coincides with or approaches the predetermined attitude direction if the first attitude is performing the motion of approaching the predetermined attitude, or setting the first attitude as an input attitude if the first attitude is not performing the motion of approaching the predetermined attitude; and
perform a predetermined information process based on the input attitude.

20. A method performing a predetermined information process with an information processing apparatus based on a motion detection signal output from an input device including a motion detection sensor for detecting its own motion, the method comprising:
- repeatedly calculating, using the information processing apparatus, an input attitude indicating an attitude of the input device based on the motion detection signal;
- calculating a rotation direction of the input attitude about a predetermined axis based on the repeatedly calculated input attitude;
- correcting the input attitude in a next rotational operation of the input device, calculated after calculating the rotation direction of the input attitude in a rotational operation of the input device, based on a difference between the rotation direction of the input attitude and a predetermined reference rotation direction; and
- performing a predetermined information process based on the corrected input attitude.

21. A system configured to perform a predetermined information process based on a motion detection signal output from an input device including a motion detection sensor for detecting its own motion, the system comprising a processor configured to:
- repeatedly calculate an input attitude indicating an attitude of the input device based on the motion detection signal;
- calculate a rotation direction of the input attitude about a predetermined axis based on the repeatedly calculated input attitude;
- correct the input attitude in a next rotational operation of the input device, calculated after calculating the rotation direction of the input attitude in a rotational operation of the input device, based on a difference between the rotation direction of the input attitude and a predetermined reference rotation direction; and
- perform a predetermined information process based on the corrected input attitude.

* * * * *